US010059450B2

(12) United States Patent
Levron

(10) Patent No.: US 10,059,450 B2
(45) Date of Patent: Aug. 28, 2018

(54) CARGO HANDLING SYSTEM, METHOD AND APPARATUS

(71) Applicant: ISRAEL AEROSPACE INDUSTRIES LTD., Lod (IL)

(72) Inventor: Rami Levron, Elaad (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 332 days.

(21) Appl. No.: 14/430,505

(22) PCT Filed: Sep. 9, 2013

(86) PCT No.: PCT/IL2013/050757
§ 371 (c)(1),
(2) Date: Mar. 23, 2015

(87) PCT Pub. No.: WO2014/049590
PCT Pub. Date: Apr. 3, 2014

(65) Prior Publication Data
US 2015/0225082 A1 Aug. 13, 2015

(30) Foreign Application Priority Data

Sep. 27, 2012 (IL) .......................................... 222208

(51) Int. Cl.
*B64D 9/00* (2006.01)
(52) U.S. Cl.
CPC ............... *B64D 9/00* (2013.01); *B64D 9/003* (2013.01); *B64D 2009/006* (2013.01)
(58) Field of Classification Search
CPC ........... B64D 9/00; B64D 9/003; B64D 9/006
See application file for complete search history.

(56) References Cited

U.S. PATENT DOCUMENTS 3,642,154 A * 2/1972 Duszka .................... B60P 1/36
414/522
3,741,504 A 6/1973 Alberti et al.
(Continued)

FOREIGN PATENT DOCUMENTS

EP 0151742 8/1985

OTHER PUBLICATIONS

International Search Report and Written Opinion from International Application No. PCT/IL2013/050757 dated Jan. 1, 2014.

*Primary Examiner* — Richard R Green
(74) *Attorney, Agent, or Firm* — Dorsey & Whitney LLP

(57) ABSTRACT

Cargo handling systems and methods for a freight deck of an aircraft are provided, as well as mobile transport apparatus. In at least one example, the system includes a support structure, at least one mobile transport apparatus, and a plurality of locking devices. The support structure is configured for at least partially supporting at least one cargo unit on the support structure, Each mobile transport apparatus is configured for selectively moving over the freight deck to a plurality of locations on the freight deck, for selectively engaging to the at least one cargo unit, for selectively propelling said at least one cargo unit over said freight deck while the apparatus is engaged to the at least one cargo unit, for enabling said at least one cargo unit to be deposited at a desired said location supported on said support structure, and for selectively disengaging from the at least one cargo unit. Each locking device is configured for selectively releasably locking the at least one cargo unit with respect to the freight deck at said desired location.

28 Claims, 20 Drawing Sheets

(56) References Cited

U.S. PATENT DOCUMENTS

| | | | |
|---|---|---|---|
| 3,809,268 A | | 5/1974 | Lutz |
| 3,906,870 A | | 9/1975 | Alberti |
| 3,978,975 A | | 9/1976 | Herbes et al. |
| 5,000,646 A | * | 3/1991 | Pietropaoli ............. B64D 9/00 |
| | | | 244/137.1 |
| 5,350,270 A | | 9/1994 | Stallard et al. |
| 6,557,800 B2 | | 5/2003 | Medina et al. |
| 6,991,082 B2 | * | 1/2006 | Olson ...................... B64D 9/00 |
| | | | 193/35 MD |
| 7,534,082 B2 | | 5/2009 | Rawdon et al. |
| 7,604,204 B2 | | 10/2009 | Jacobsen et al. |
| 2002/0020782 A1 | | 2/2002 | Huber |
| 2005/0211840 A1 | | 9/2005 | Grether et al. |
| 2009/0121084 A1 | | 5/2009 | Hettwer |
| 2009/0304482 A1 | | 12/2009 | Sanford et al. |
| 2012/0200259 A1 | * | 8/2012 | Sullivan ................ B65G 47/04 |
| | | | 320/109 |

* cited by examiner

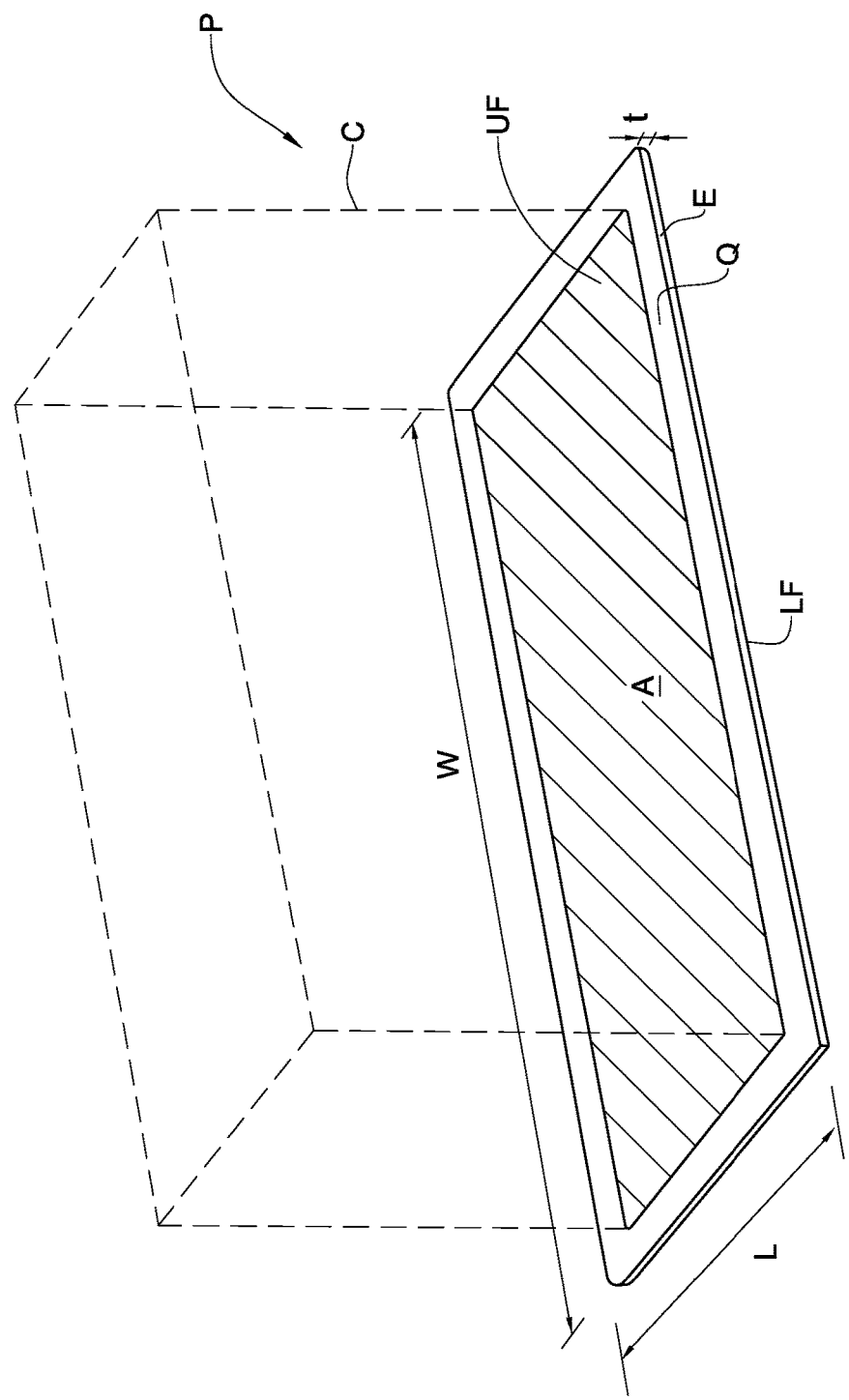

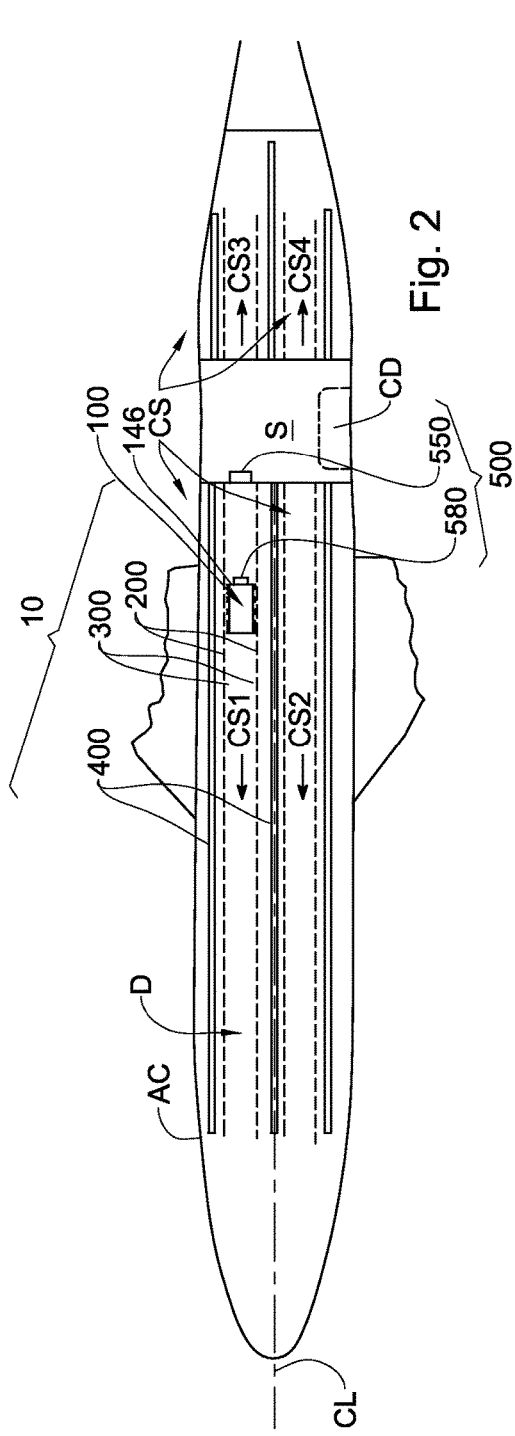
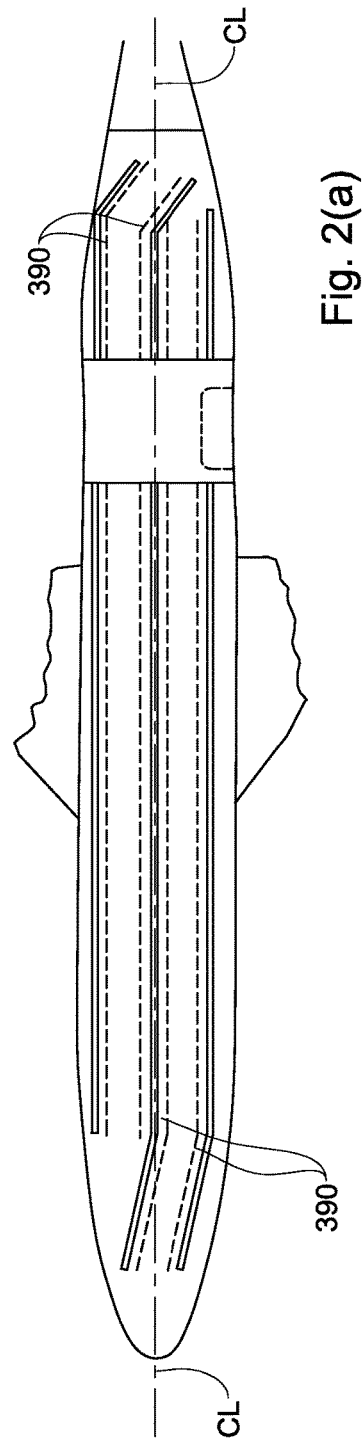

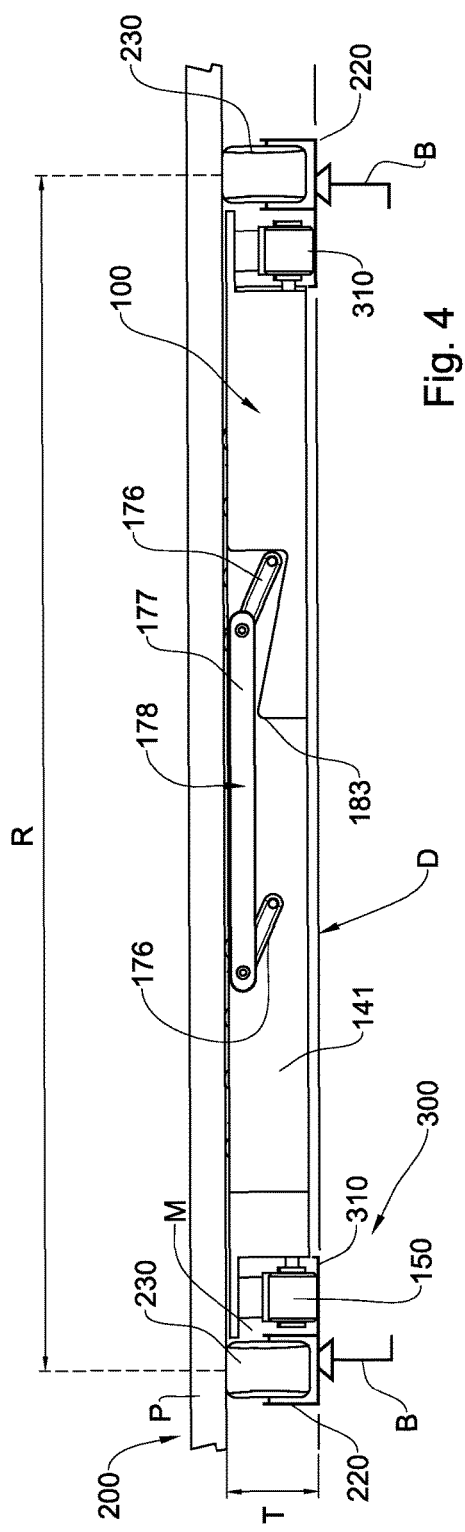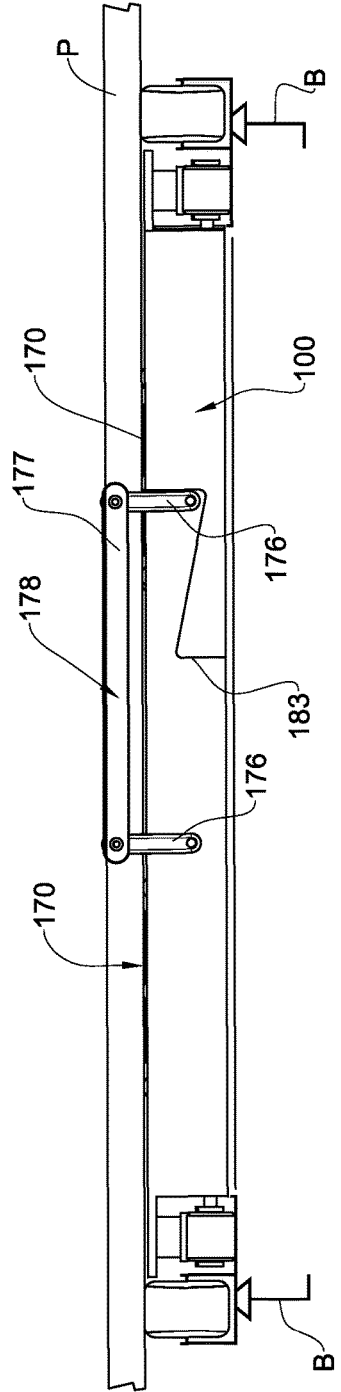

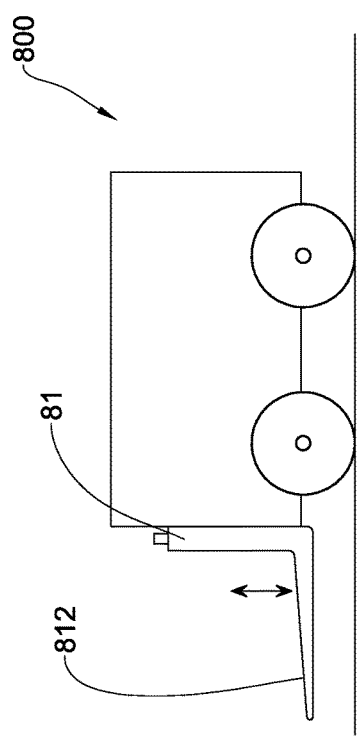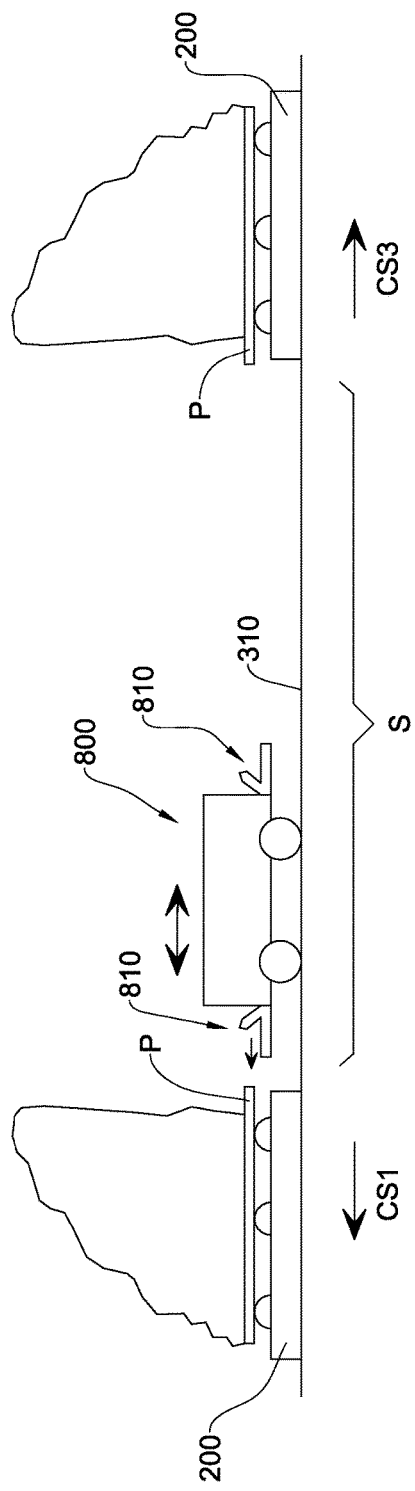

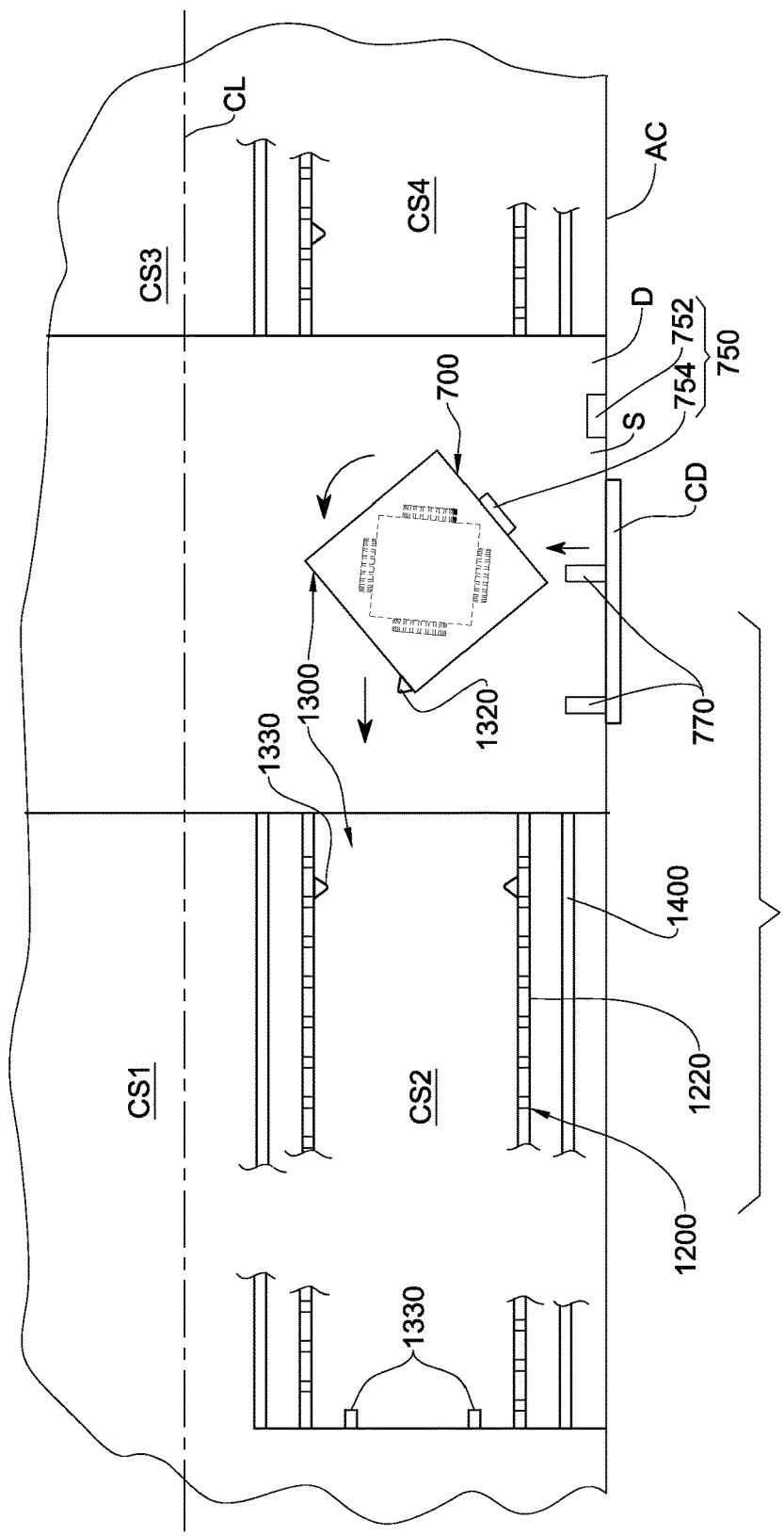

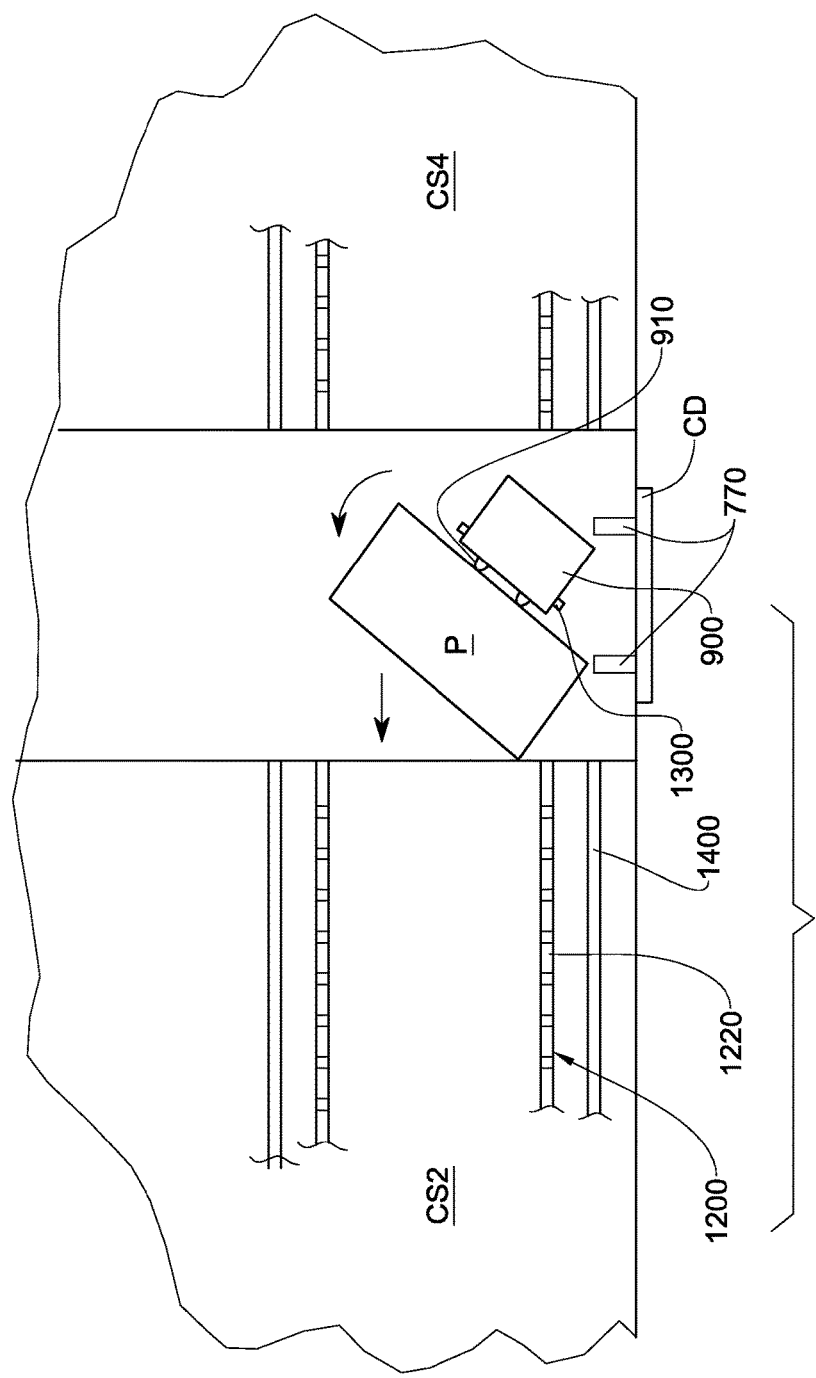

CARGO HANDLING SYSTEM, METHOD AND APPARATUS

TECHNOLOGICAL FIELD

The presently disclosed subject matter relates to cargo handling systems, methods and apparatuses, particularly for freight aircraft.

BACKGROUND

Cargo aircraft routinely transport cargo (also referred to herein as air freight) over national and international routes. Such cargo is often containerized and secured on standardized pallets, which can be loaded, secured and unloaded from the aircraft freight deck using respective cargo handling systems (CHS).

Conventional aircraft CHS can be classified into two general categories: manual handling systems; powered handling systems.

Manual CHS often include a plurality of rollers and/or castors and/or ball transfer units (BTU) set on the floor of the freight deck, and pallets supporting the cargo are manually moved over the rollers and/or castors, and secured in place with ropes, belts, or other locking devices.

Powered CHS conventionally include a conveyor system that is built into the floor of the freight deck of the aircraft and which move the standardized cargo pallets over the floor of the freight deck. For example, powered drive units (PDU) statically located on the freight deck provide a series of longitudinally spaced powered drive wheels on the floor that in turn engage the underside of the standardized pallets and horizontally move the standardized pallet in a variety of horizontal directions on the freight deck. When at the desired locations, the cargo pallets are secured thereat via a plurality of locking devices that lock onto a peripheral lip of the pallet.

By way of non-limiting examples, the following publications disclose cargo handling systems or components related thereto: U.S. Pat. No. 3,741,504, U.S. Pat. No. 3,978,975, U.S. Pat. No. 6,557,800, U.S. Pat. No. 3,906,870.

GENERAL DESCRIPTION

According to a first aspect of the presently disclosed subject matter, there is provided a cargo handling system for a freight deck of an aircraft, comprising:
  support structure configured for at least partially supporting at least one cargo unit thereon;
  at least one mobile transport apparatus configured for selectively moving over the freight deck to at least one or to a plurality of locations thereon, for selectively engaging to the at least one cargo unit, for selectively propelling said at least one cargo unit over said freight deck while the apparatus is engaged to the at least one cargo unit, for enabling said at least one cargo unit to be deposited at a desired said location supported on said support structure, and for selectively disengaging from the at least one cargo unit;
  a plurality of locking devices configured for selectively releasably locking the at least one cargo unit with respect to the freight deck at said desired location.

The cargo handling system according to the aforesaid first aspect of the presently disclosed subject matter can comprise one or more of the following elements or features.

For example, each said mobile transport apparatus can comprise a releasable engagement system for selectively engaging with and disengaging from said at least one cargo unit, and a powered drive unit configured for selectively propelling the respective said mobile transport apparatus over the freight deck. For example, said powered drive unit comprises a plurality of wheels rotatably mounted thereto and configured for rolling over the freight deck. For example, said wheels are operatively connected to powered drive for turning said wheels.

Optionally, said wheels are mounted to a chassis member such that the rotational axes of said wheels are in parallel relationship with one another, and further optionally, said wheels comprise any one of omni wheels, poly wheels and Mecanum wheels.

Alternatively, said wheels are mounted to a chassis member such that the rotational axes of said wheels are not all in parallel relationship with one another, and further optionally, said wheels comprise any one of omni wheels, poly wheels and Mecanum wheels. For example, said wheels are mounted to a chassis member such that the rotational axes of said wheels are in non-parallel relationship with one another. For example, the mobile transport system comprises at least one set of wheels, each set comprising four said wheels mounted to a chassis member such that the rotational axes of two said wheels are in orthogonal relationship with the rotational axes of the other two said wheels. Alternatively, the mobile transport system comprises at least one set of wheels, each set comprising three said wheels mounted to a chassis member in triangular arrangement.

Additionally or alternatively to the above, in at least one example of the cargo handling system, said wheels are rotatably mounted with respect to the apparatus in fixed orientation with respect thereto, and wherein a rotational direction and turning velocity of each wheel are each independently controllable to enable the mobile transport apparatus to move in any desired direction over the freight deck.

Additionally or alternatively to the above, in at least one example of the cargo handling system, said support structure comprises at least one pair of parallel spaced support rails configured for at least partially supporting said at least one cargo unit thereon while allowing said at least one cargo unit to move over said spaced support rails. For example, said support rails comprise rollers rotatably mounted to an upper part thereof, such as to allow said at least one cargo unit to move over said spaced support rails with said rollers in rolling contact with said at least one cargo unit.

Additionally or alternatively to the above, in at least one example of the cargo handling system, said mobile transport apparatus is configured for propelling the said at least one cargo unit when said at least one cargo unit is in overlying relationship therewith. For example, parts of said mobile transport apparatus in overlying relationship with said at least one cargo unit have a height dimension from the freight deck not exceeding a datum height dimension defined by said support structure.

Additionally or alternatively to the above, in at least one example of the cargo handling system, said releasable engagement system is configured for releasably engaging with an underside of said at least one cargo unit. For example, said releasable engagement system comprises an apparatus height changing system, configured for selectively changing the height of said mobile transport apparatus from a first height, less than said datum height dimension, to a second height, not less than said datum height dimension. Additionally or alternatively, said releasable engagement system comprises a cam arrangement pivotably mounted to the chassis member and operatively connected to a vertically displaceable upper cargo unit contact plate, and wherein said cam arrangement comprises a plurality of cams that are selectively are reversibly pivotable while in urging contact with said contact plate to thereby vary the height of the contact plate. Additionally or alternatively, said releasable engagement system is configured for selectively changing the height dimension of said mobile transport apparatus via any one of a jack arrangement, an inflatable arrangement a scissor lift mechanism, and a pivotable arrangement for said wheels.

Additionally or alternatively to the above, in at least one example of the cargo handling system, said mobile transport apparatus is configured having a height between 2 inches and 5 inches.

Additionally or alternatively to the above, in at least one example of the cargo handling system, said mobile transport apparatus is configured for propelling the said at least one cargo unit when said at least one cargo unit is in at least partially juxtaposed relationship therewith.

Additionally or alternatively to the above, in at least one example of the cargo handling system, said releasable engagement system is configured for selectively clamping with respect to a peripheral lip of the cargo unit.

Additionally or alternatively to the above, in at least one example of the cargo handling system, the respective cargo handling system further comprises a controller configured for remotely controlling operation of at least said mobile transport apparatus.

Additionally or alternatively to the above, in at least one example of the cargo handling system, the respective cargo handling system further comprises a guiding system configured for guiding said at least one mobile transport apparatus with respect to the freight deck. For example, said guiding system comprises guiding rails configured for constraining movement of said wheels to said guiding rails. Additionally or alternatively, said guiding system comprises a sensor arrangement configured for providing control signals to said mobile transport apparatus for controlling movement thereof along a predetermined path over the freight deck.

Additionally or alternatively to the above, in at least one example of the cargo handling system, said mobile transport apparatus comprises at least one of:
 a battery, the system further comprising a recharging system, including a recharger docking station provided in the freight deck and connected to a power supply and a docking head provided in the mobile transport apparatus, the docking head and docking station being configured for establishing electrical connection with one another when said docking head docks with said docking station; and
 electrical cables reversibly wound on a spool, the spool being mounted to one of the mobile transport apparatus and the freight deck, and wherein electrical power is provided to the mobile transport apparatus by a power source in the aircraft or outside of the aircraft via said electrical cables, and wherein the electrical cables are spooled in or out according to the relative location of the mobile transport apparatus with respect to the freight deck.

Additionally or alternatively to the above, in at least one example of the cargo handling system, the aircraft has a side freight entrance to the freight deck, and the respective cargo handling system further comprises a plurality of BTU's and/or a plurality of pivotable PDU's on a portion of the freight deck facing the side freight entrance.

Additionally or alternatively to the above, in at least one example of the cargo handling system, said cargo unit is in the form of, or comprises, a pallet.

Additionally or alternatively, the cargo handling system comprises a wireless control system for wirelessly controlling operation of said transport apparatus.

For example, the wireless control system according to the first aspect of the presently disclosed subject matter can comprise one or more of the elements or features as disclosed herein with respect to the wireless control system according to the second aspect of the presently disclosed subject matter, mutatis mutandis.

Additionally or alternatively, said cargo handling system comprises a sensor system configured for outputting an alignment signal representative of an alignment of the cargo unit with respect to the support structure. For example the sensor system according to the first aspect of the presently disclosed subject matter can comprise one or more of the elements or features as disclosed herein with respect to the sensor system according to the third aspect of the presently disclosed subject matter, mutatis mutandis.

According to the aforesaid first aspect of the presently disclosed subject matter, there is also provided a mobile transport apparatus for use with a cargo handling system for a freight deck of an aircraft, the mobile transport apparatus configured for selectively moving over the freight deck to a plurality of locations thereon, for selectively engaging to at least one cargo unit, for propelling said at least one cargo unit over said freight deck when the apparatus is engaged to the at least one cargo unit, for depositing said at least one cargo unit on a desired said location supported on a support structure provided on the freight deck, and for selectively disengaging from the at least one cargo unit.

The mobile transport apparatus according to the aforesaid first aspect of the presently disclosed subject matter can comprise one or more of the following elements or features.

For example, the mobile transport apparatus comprises a releasable engagement system for selectively engaging with and disengaging from said at least one cargo unit, and a powered drive unit configured for selectively propelling the respective said mobile transport apparatus over the freight deck.

Additionally or alternatively to the above, said mobile transport apparatus is configured for propelling the said at least one cargo unit when said at least one cargo unit is in overlying relationship therewith or in at least partially juxtaposed relationship therewith. For example, parts of said mobile transport apparatus in overlying relationship with said at least one cargo unit have a height dimension from the freight deck not exceeding a datum height dimension defined by the support structure.

Additionally or alternatively to the above, said mobile transport apparatus is configured having a height between 2 inches and 5 inches.

Additionally or alternatively to the above, said mobile transport apparatus further comprises a controller configured for enabling remotely controlling operation thereof.

Additionally or alternatively to the above, the mobile transport apparatus can further optionally comprise a guiding system configured for guiding said mobile transport apparatus with respect to the freight deck.

Additionally or alternatively to the above, said mobile transport apparatus can comprise at least one of:
 a battery, and further comprising a recharging system, including a recharger docking station provided in the freight deck and connected to a power supply and a docking head provided in the mobile transport apparatus, the docking head and docking station being configured for establishing electrical connection with one another when said docking head docks with said docking station; and electrical cables reversibly wound on a spool, the spool being mounted to one of the mobile transport apparatus and the freight deck, and wherein electrical power is provided to the mobile transport apparatus by a power source in the aircraft or outside of the aircraft via said electrical cables, and wherein the electrical cables are spooled in or out according to the relative location of the mobile transport apparatus with respect to the freight deck.

Additionally or alternatively to the above, said cargo unit is in the form of, or comprises, a pallet.

Additionally or alternatively, said mobile transport apparatus comprises a wireless control system for wirelessly controlling operation of said transport apparatus.

For example, the wireless control system according to the first aspect of the presently disclosed subject matter can comprise one or more of the elements or features as disclosed herein with respect to the wireless control system according to the second aspect of the presently disclosed subject matter, mutatis mutandis.

Additionally or alternatively, said mobile transport apparatus comprises a sensor system configured for outputting an alignment signal representative of an alignment of the cargo unit with respect to the support structure. For example the sensor system according to the first aspect of the presently disclosed subject matter can comprise one or more of the elements or features as disclosed herein with respect to the sensor system according to the third aspect of the presently disclosed subject matter, mutatis mutandis.

According to the aforesaid first aspect of the presently disclosed subject matter, there is also provided a method for handling cargo units on a freight deck of an aircraft, comprising:

causing at least one mobile transport apparatus to move over the freight deck to at least one of a plurality of locations thereon;

selectively engaging the at least one mobile transport apparatus to the at least one cargo unit at one said location;

propelling said at least one cargo unit over said freight deck to a second said location while the at least one mobile transport apparatus is engaged to the at least one cargo unit;

selectively disengaging the mobile transport apparatus from the at least one cargo unit; and depositing said at least one cargo unit at said second location on the freight deck.

The method according to the aforesaid first aspect of the presently disclosed subject matter can comprise one or more of the following elements or features.

For example, the method can comprise:

providing a support structure on the flight deck and comprising the step of depositing said at least one cargo unit at said second location on said support structure on the freight deck; and selectively releasably locking the at least one cargo unit with respect to the freight deck at said second location.

Additionally or alternatively, the method can comprise controlling the motion of the mobile transport apparatus over the freight deck in any one of a manual manner, an automatic manner, an autonomous manner and via remote control.

Additionally or alternatively, the method can comprise at least one of:

inserting a said cargo unit into the freight deck via a side entrance of the aircraft, steering said mobile transport apparatus towards said cargo unit, engaging said cargo unit and steering the mobile transport apparatus to a desired location along a desired cargo path defined on the freight deck, depositing said cargo unit thereat, and disengaging said mobile transport apparatus from said cargo unit;

inserting a said cargo unit into the freight deck via a side entrance of the aircraft, aligning and directing said cargo unit, towards a desired rectilinear cargo path defined on the freight deck, engaging said cargo unit and to said mobile transport apparatus on said cargo path, propelling said mobile transport apparatus to a desired location along a desired cargo path while engaged to the cargo unit, depositing said cargo unit thereat, and disengaging said mobile transport apparatus from said cargo unit;

inserting a said cargo unit into the freight deck via a nose or tail entrance of the aircraft, steering said mobile transport apparatus towards said cargo unit, engaging said cargo unit and steering the mobile transport apparatus to a desired location along a desired cargo path defined on the freight deck, depositing said cargo unit thereat, and disengaging said mobile transport apparatus from said cargo unit.

Additionally or alternatively, the method can comprise the step in which said mobile transport apparatus propels the said at least one cargo unit when said at least one cargo unit is in overlying relationship therewith or in at least partially juxtaposed relationship therewith.

Additionally or alternatively, the method can comprise selectively changing the height of said mobile transport apparatus from a first height, less than a spacing of a space between the cargo unit and the freight deck, introducing the mobile transport apparatus into said space so that said cargo unit is overlying said mobile transport apparatus, to a second height, greater than said first height, wherein to engage with an underside of the cargo unit.

Additionally or alternatively, in the method said cargo unit is in the form, of or comprises a pallet.

According to a second aspect of the presently disclosed subject matter, there is also provided a cargo handling system for a freight deck of an aircraft, comprising:

support structure configured for at least partially supporting at least one cargo unit thereon over the freight deck;

transport apparatus configured for selectively transporting the at least one cargo unit over said support structure;

wireless control system for wirelessly controlling operation of said transport apparatus.

The cargo handling system according to the aforesaid second aspect of the presently disclosed subject matter can comprise one or more of the following elements or features.

For example, the cargo handling system can further comprise a plurality of locking devices configured for selectively releasably locking the at least one cargo unit with respect to the freight deck at a desired location.

Additionally or alternatively, said transport apparatus comprises a mobile transport apparatus configured for selectively moving over the freight deck to a plurality of locations thereon, for selectively engaging to said at least one cargo unit, for propelling said at least one cargo unit over said freight deck when the mobile transport apparatus is engaged to the at least one cargo unit, for depositing said at least one cargo unit on a desired said location supported on said support structure, and for selectively disengaging from the at least one cargo unit. For example the mobile transport apparatus according to the second aspect of the presently disclosed subject matter can comprise one or more of the elements or features as disclosed herein with respect to the mobile transport apparatus according to the first aspect of the presently disclosed subject matter, mutatis mutandis. Alternatively, said transport apparatus comprises a plurality of powered drive units (PDU's) statically located on the freight deck and longitudinally spaced parallel to said support structure, each PDU comprising a powered drive wheel configured for selectively engaging an underside of the at least one cargo unit for moving the at least one cargo unit over said support structure.

Additionally or alternatively, said wireless control system comprises a transmitter unit remote from a receiver unit, said receiver unit being operatively coupled to the transport apparatus and configured for controlling operation of the transport apparatus responsive to receiving control signals transmitted from said transmitter unit. For example, said control signals include electromagnetic signals, for example radio signals, infra red signals, microwave signals, and so on.

Additionally or alternatively, said cargo handling system comprises a sensor system configured for outputting an alignment signal representative of an alignment of the cargo unit with respect to the support structure. For example the sensor system according to the second aspect of the presently disclosed subject matter can comprise one or more of the elements or features as disclosed herein with respect to the sensor system according to the third aspect of the presently disclosed subject matter, mutatis mutandis.

According to a third aspect of the presently disclosed subject matter, there is also provided a cargo handling system for a freight deck of an aircraft, comprising:
   support structure configured for at least partially supporting at least one cargo unit thereon over the freight deck;
   sensor system configured for outputting an alignment signal representative of an alignment of the cargo unit with respect to the support structure.

The cargo handling system according to the aforesaid third aspect of the presently disclosed subject matter can comprise one or more of the following elements or features.

For example, said alignment comprises a degree of alignment between cargo unit and the support structure compared with an ideal alignment, and said alignment signal is representative of said degree of alignment. For example, said ideal alignment occurs where the cargo unit is sufficiently aligned with respect to the support structure to enable the cargo unit to be moved over and supported by the support structure.

Additionally or alternatively, said sensor system comprises a first component coupled to the at least one cargo unit and a second component coupled to the support structure, wherein said first component interacts with said second component to generate said alignment signal. For example:
   one of said first component and second component comprises a transmitter and wherein the other one of said first component and second component comprises a receiver, and wherein said receiver transmits energy to said receiver, and wherein a parameter of said energy varies as a function of said degree of alignment wherein to generate said alignment signal;
   or:
   said first component comprises an image acquisition system and second component comprises a visual marker representative of said ideal alignment, and wherein said image acquisition system obtains and processes images of said visual marker wherein to generate said alignment signal.

Additionally or alternatively, said alignment signal is at least one of an audio signal and a visual signal to guide manual manipulation of the cargo unit into alignment with the support structure.

Additionally or alternatively, the cargo handling system further comprises a mobile transport apparatus configured for selectively moving over the freight deck to a plurality of locations thereon, for selectively engaging to the at least one cargo unit, for propelling the at least one cargo unit over said freight deck when the mobile transport apparatus is engaged to the at least one cargo unit, for depositing the at least one cargo unit on a desired said location supported on said support structure, and for selectively disengaging from the at least one cargo unit, wherein said alignment signal is at least one of a digital signal and an electromagnetic signal to, and wherein said mobile transport apparatus is further configured for controlling movement of the cargo unit into alignment with the support structure responsive to said alignment signal. For example the mobile transport apparatus according to the third aspect of the presently disclosed subject matter can comprise one or more of the elements or features as disclosed herein with respect to the mobile transport apparatus according to the first aspect of the presently disclosed subject matter, mutatis mutandis.

Additionally or alternatively, the cargo handling system comprises
   transport apparatus configured for selectively transporting the at least one cargo unit over said support structure;
   wireless control system for wirelessly controlling operation of said transport apparatus.

For example the transport apparatus according to the third aspect of the presently disclosed subject matter can comprise one or more of the elements or features as disclosed herein with respect to the transport apparatus according to the second aspect of the presently disclosed subject matter, mutatis mutandis.

Additionally or alternatively, for example, the wireless control system according to the third aspect of the presently disclosed subject matter can comprise one or more of the elements or features as disclosed herein with respect to the wireless control system according to the second aspect of the presently disclosed subject matter, mutatis mutandis.

A feature of at least some examples of the presently disclosed subject matter is that the respective cargo handling system can shorten the time and/or the manpower required for loading and/or for unloading cargo with respect to an aircraft, as compared with conventional CHS installed in the same type of aircraft.

Another feature of at least some examples of the presently disclosed subject matter is that in the case of malfunction, servicing, or maintenance of the respective mobile transport apparatus, this can be replaced with another mobile transport apparatus, and thus enable the aircraft to proceed with loading/unloading in a relatively short time.

Another feature of at least some examples of the presently disclosed subject matter is that the weight of the respective cargo handling system can be significantly less than the weight of a conventional cargo handling system.

Another feature of at least some examples of the presently disclosed subject matter is that the respective mobile transport apparatus can be controlled remotely by an operator, and can have its own power unit, and thus requires little if any of the infrastructure that is specifically required with conventional CHS. This enables these examples of the cargo transport system to be installed in the cargo deck of an aircraft with a minimum of modification of the cargo deck, not requiring (or at least minimizing the need for) conventional CHS ducting, cables, wiring, control panels, PDU's, etc to be installed in the cargo deck itself. Less installation tasks are thus required during manufacture of a cargo aircraft or when converting a passenger aircraft to a cargo aircraft, than are required with conventional CHS. This considerably simplifies the installation of the respective cargo handling system in the aircraft, which can be accomplished in much faster manner and at less cost than with conventional CHS.

Another feature of at least some examples of the presently disclosed subject matter is that the respective cargo handling system provides an improvement in reliability as compared with conventional CHS installed in the same type of aircraft.

BRIEF DESCRIPTION OF THE DRAWINGS

In order to understand the disclosure and to see how it may be carried out in practice, examples will now be described, by way of non-limiting example only, with reference to the accompanying drawings, in which:

FIG. 1 is an isometric view of a pallet or cargo unit, for use with examples of the cargo handling system of the presently disclosed subject matter.

FIG. 4 illustrates in front view the example of FIG. 2, wherein the respective deployable mechanical abutment member is in its retracted position.

FIG. 5 illustrates in front view the example of FIG. 2, wherein the respective deployable mechanical abutment member is in its deployed position.

FIG. 13(a) is a side view of an alternative example of a transport apparatus comprised in the cargo handling system example of FIG. 12; FIG. 13(b) is a side view of another alternative example of a transport apparatus comprised in the cargo handling system example of FIG. 12.

FIG. 14 is a partial plan view of a cargo handling system according to a third example of the presently disclosed subject matter.

FIG. 19 is a partial plan view of a cargo handling system according to a fourth example of the presently disclosed subject matter.

DETAILED DESCRIPTION

Figure 2B:
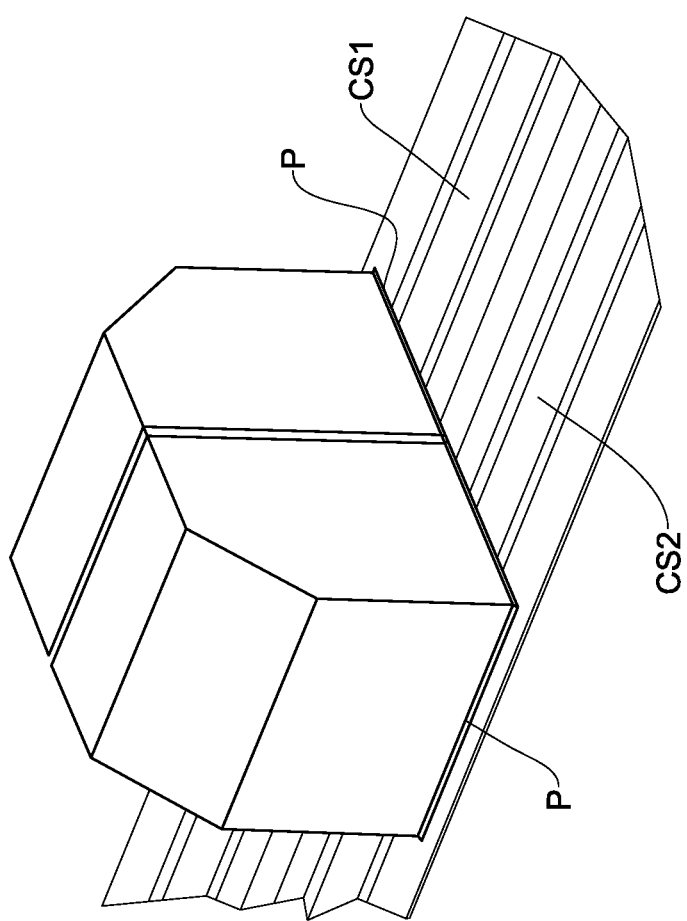
FIG. 2(b) is a partial isometric view of the example of FIG. 2 used with two cargo units in side-by-side relationship.

Referring to FIG. 1, a particular type of standardized cargo pallet (interchangeably referred to herein as a loading platform), generally designated with the reference character P, is illustrated in FIG. 1. Such a pallet P is in the form of a rectangular plate member, having width W, length L, nominal thickness t, and peripheral edge E. The pallet P defines a cargo-loading area A on its upper face UF, and, cargo C can be affixed in place on area A. Area A is spaced from edge E by a peripheral lip Q, which circumscribes the area A. The peripheral lip Q is configured for being engaged with locking devices on the freight deck of an aircraft, as is known in the art. In some cases, standardized cargo containers (e.g. unit load devices (ULD)) have an integral pallet formed therewith, and each standardized cargo container comprises a respective peripheral lip configured for engaging with the aforesaid locking devices. In some commonly used pallets, the plan area of the pallet (W×L) can be any one of: 125 inch×96 inch, or 125 inch×88 inch, or 156.2 cm×153.4 cm.

While the following disclosure refers to cargo units in the form of the aforesaid pallet P (with or without cargo affixed thereto), it is to be noted that the disclosure applies, mutatis mutandis, to other types of pallets, and also to other types of cargo units, that can be handled by at least some examples of the system, method and apparatus of the presently disclosed subject matter.

Referring to FIG. 2, a cargo handling system 10 for handling each of a plurality of cargo units, according to a first example of the first aspect of the presently disclosed subject matter, comprises one (or more) mobile transport apparatus 100 (also interchangeably referred to herein as "apparatus" or as "transport apparatus"), a cargo support system 200, a guiding system 300, and a plurality of locking devices 400 located on the freight deck D. Each cargo unit comprises or is securely carried on a respective pallet P, with respect to a cargo storage path CS defined on the freight deck D of an aircraft AC.

In this example, the aircraft AC comprises a cargo door CD on one side of the aircraft for loading and unloading the cargo (via pallets P) with respect to the fright deck D, and there are four cargo storage paths CS defined on the freight deck D, designated CS1, CS2, CS3, CS4, originating from a pallet turning and alignment area S located on the freight deck D in the vicinity of the side cargo door CD of the aircraft. Two cargo storage paths CS1, CS2 are generally parallel to one another and to the centerline CL of the aircraft, and extend forward of the pallet turning and alignment area S, and the other two cargo storage paths CS3, CS4 are generally parallel to one another and to the centerline CL of the aircraft, and extend aft of the pallet turning and alignment area S. Such cargo storage paths CS are configured for pallets P that are of a suitable size to fit within less than a half-width of the freight deck D, so that two rows of pallets P are loadable onto the juxtaposed pairs of cargo storage paths CS1, CS2 (or the juxtaposed pairs of cargo storage paths CS3, CS4), in side-by-side configuration, as illustrated in FIG. 2(b) for example. In alternative variations of this example other configurations for one or more cargo storage paths can be defined instead.

Referring also to FIG. 4, the cargo support system 200 comprises at least one pair of parallel support rails 220, arranged along each respective cargo storage path CS. Each rail 220 comprises a plurality of rollers 230 rotatably mounted thereto such that an upper part of the rollers 230 project above the rails 220. The rollers 230 are spaced longitudinally along the length of the rails 220 and having their respective rolling axes orthogonal to the longitudinal direction of the rails 220. The rails 220 are spaced apart by spacing R, and are configured for supporting all, or at least a majority of, the weight of each pallet P (together with its cargo) as the pallet P is being transported over the rails 220 via contact with the rollers 230, and at a spacing T above the freight deck D, during operation of the system 10. The rails 220 are also configured for supporting all of the weight of all the pallets P (each, together with its cargo) when all the pallets P have been deposited, each at its final position, along the respective cargo storage path CS, as well as additional g-forces according to specifications.

Accordingly, each rail 220 is on, or close to, a respective load bearing beam B of the freight deck D so that the weight of the pallet and cargo is supported by the respective load bearing beam B without damaging the floor of the freight deck D, and thus minimizing any moment arm of the aforesaid load with respect to the respective bearing beam B.

In this example and in other examples, spacing T, and thus the maximum height of the apparatus 100, is or can be adjusted to be in the range between about 2 inches (about 5.1 cm) and 4 inches (about 10.2 cm), or between about 2 inches (about 5.1 cm) and 5 inches (about 12.7 cm), for example about 3 inches (about 7.6 cm).

Referring also to FIGS. 3(a) to 3(d), the apparatus 100 is configured for transporting in turn each pallet P (together with its cargo) with respect to the respective cargo path CS on freight deck D, for depositing the pallet P at its final position in the respective cargo storage path CS, and for disengaging from the pallet P. The apparatus 100 is guided along the respective cargo storage path CS via guiding system 300.

The apparatus 100 is mobile and comprises a releasable engagement system 110, a powered drive unit 140 and a controller 160. In at least this example, the apparatus 100 is configured for selectively transporting each pallet P, one at a time, while each respective pallet P is in overlying relationship therewith, and is thus accommodated in the space M between the underside, i.e. lower face LF, of the pallet P and the freight deck D.

The releasable engagement system 110 is configured for selectively engaging to, and for selectively disengaging from, the apparatus 100 with respect to each pallet P in operation of the system 10. The powered drive unit 140 is configured for selectively moving the apparatus 100 over the freight deck D to any one of a plurality of locations thereon along the respective cargo path CS, and for concurrently propelling the respective pallet P to at least one such location when the apparatus 100 is engaged to the cargo unit via the engagement system 110 and pallet P. The controller 160 is configured for controlling movement of the apparatus 100 with respect to the freight deck D, in particular with respect to the respective cargo path CS.

The powered drive unit 140 comprises a chassis member 141 having a generally parallelepiped shape, with two lateral sides 142, a front end 144, and a rear end 146, and a top 148. Each lateral side 142 is inboard of and facing the respective rails 220. The apparatus 100 comprises a plurality of wheels 150 rotatably mounted at each lateral side 142, and at least some of these wheels are operatively connected to motors 151 housed in the chassis member 141 to provide motive power to the wheels 150, which in operation roll over the flight deck D to displace the powered drive unit 140 with respect thereto.

In this example, releasable engagement system 110 operates to selectively provide a clearance between the top 148 and the lower face LF of the pallet P to enable the pallet P and the apparatus 100 to move with respect to one another between a position in which pallet P and the apparatus 100 are not in overlying relationship and a position in which pallet P and the apparatus 100 are in overlying relationship. The releasable engagement system 110 further operates to selectively remove this clearance between the top 148 and the lower face LF of the pallet P, in particular when the pallet P and the apparatus 100 are in overlying relationship, so that the apparatus 100 engages with the lower face LF of the pallet P, engaging the same thereby enabling both the apparatus 100 and the pallet P to move together propelled by the powered drive unit 140.

In other words, the releasable engagement system 110 is configured for releasably engaging with the underside or lower face LF of the pallet P. Furthermore, the releasable engagement system 110 comprises or is in the form of an apparatus height changing system, configured for selectively effectively changing the height of the mobile transport apparatus 100 from a first height, less than a datum height dimension defined by spacing T, to a second height, not less than this datum height dimension.

Figure 3A:
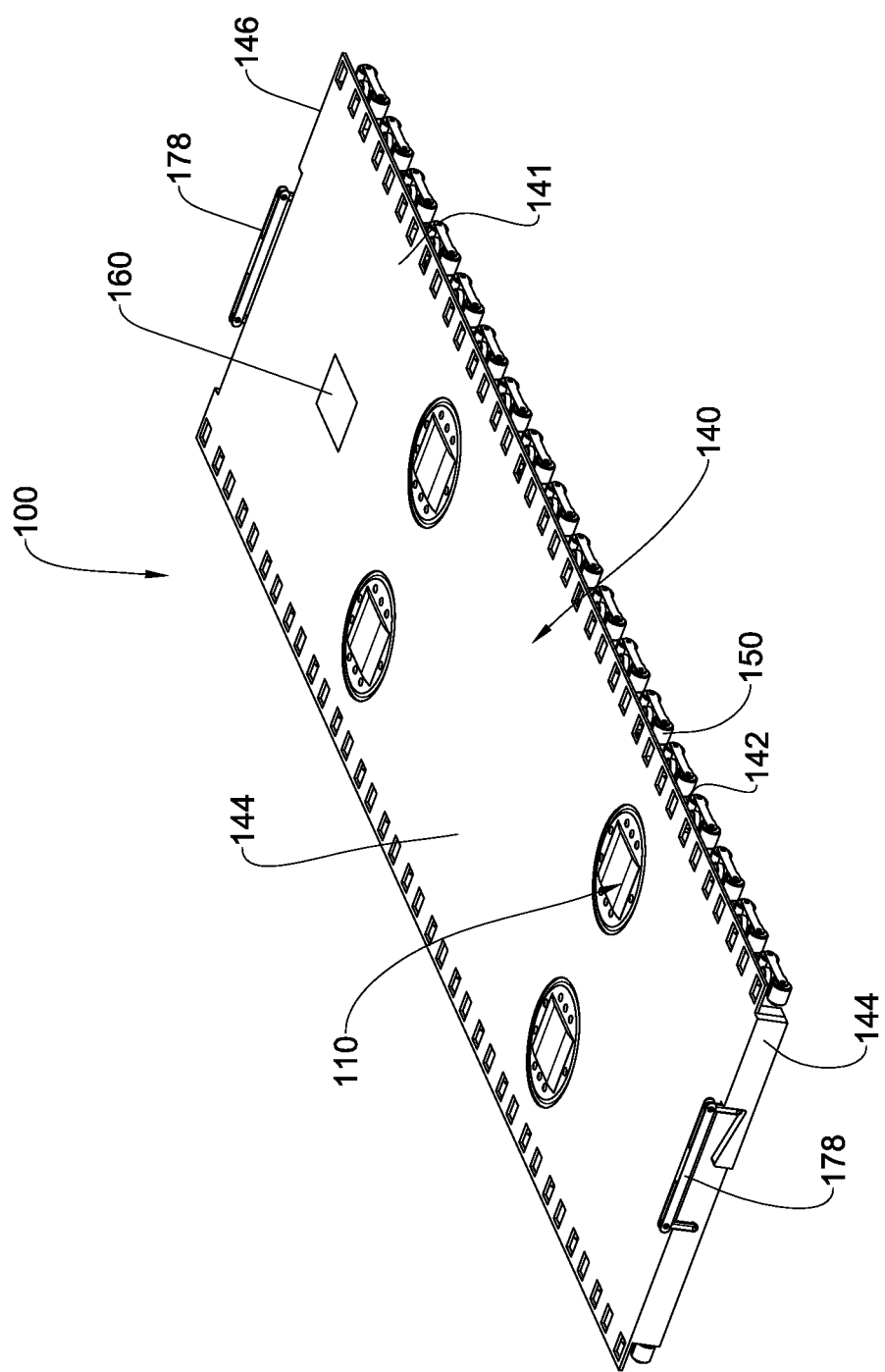
FIG. 3(a) illustrates in isometric top view a first example of the mobile transport apparatus of the system of FIG. 2.
Figure 3B:
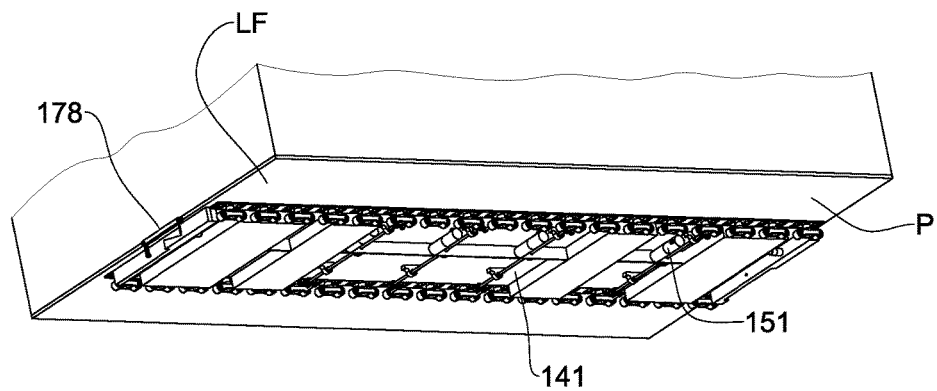
FIG. 3(b) illustrates in isometric bottom view the mobile transport apparatus of FIG. 3(a) engaged to a cargo unit.
Figure 3C:
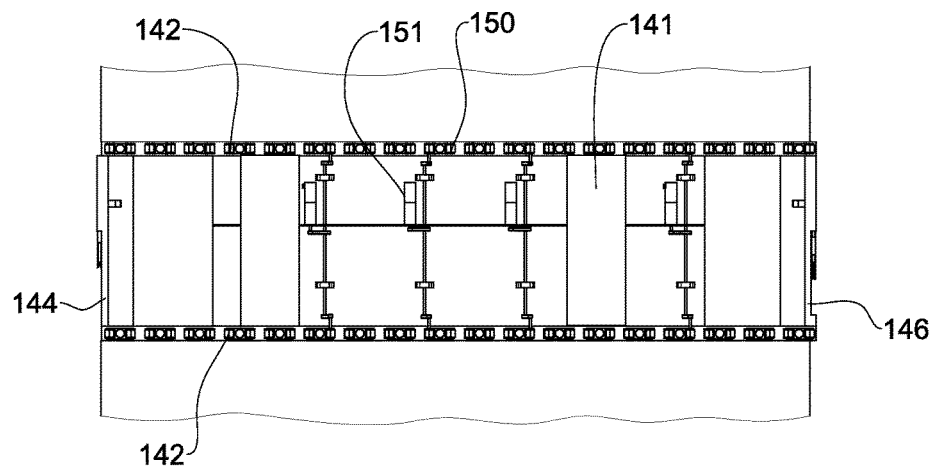
FIG. 3(c) illustrates in bottom view the mobile transport apparatus of FIG. 3(a) engaged to a cargo unit.

Thus, in this example, and referring to FIG. 3(a), the releasable engagement system 110 comprises four retractable powered engagement units 170 (though in alternative variations of this example the releasable engagement system 110 can instead comprise one, two, three or more than four retractable powered engagement units 170, mutatis mutandis).

Figure 3D:
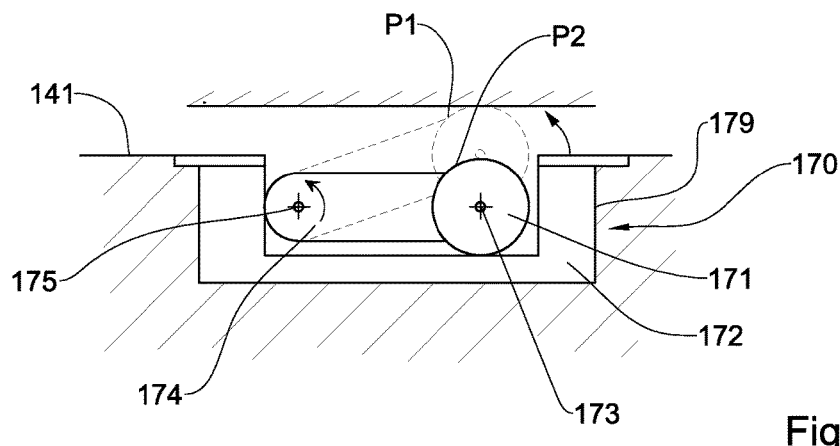
FIG. 3(d) illustrates in cross-sectional side view of an example of a releasable engagement system of the mobile transport apparatus of FIG. 3(a).

Referring to FIG. 3(d), each retractable powered engagement unit 170 comprises at least one roller or wheel 171 mounted on a horizontal axle 173, and comprising a motor for selectively rotating the wheel 171 in clockwise and/or anticlockwise directions. The wheel 171 is pivotably mounted to a housing member 172 via a strut member 174 that is pivoted to the housing member 172 at pivot axis 175. The strut member 174 comprises a powered actuator to enable the wheel 171 to be selectively positioned between at least a first (deployed) position p1 and a second (retracted) position p2. The first position p1 is an upper position for maximum frictional engagement between the wheel 171 and the underside of the pallet P. The second position p2 is a lowermost position in which the wheel 171 is fully disengaged with respect to the underside of the pallet P.

The retractable powered engagement units 170 are mounted in wells 179 provided on the top 148 of the chassis member 141, such that in said first position p1 the respective wheels 171 do not protrude above the top 148, and thus maintain the effective height of the apparatus 100 at less than T. In the second position, the wheels 171 protrude above top 148, thereby increasing the effective height of the apparatus 100, and enabling frictional engagement with the underside of a pallet P.

The chassis member 141 has a longitudinal length that is the same or slightly greater than the longitudinal length of the pallet P, and comprises selectively deployable mechanical abutment members 178 at each one of the front end 144, and the rear end 146. Referring in particular to FIGS. 4 and 5, each abutment member 178 comprises a horizontal primary strut member 177 pivotably mounted to the respective front end 144 or rear end 146 via a pair of spaced, parallel secondary strut members 176. The secondary strut members 176 can be pivoted from a first (retracted) position illustrated in FIG. 4 (and optionally prevented from pivoting further via mechanical stop 183), in which the primary strut member 177 is at a height at or below the top 148, to a second (deployed) position illustrated in FIG. 5, in which the primary strut member 177 is at a height well above the top 148. In fact, in the second position the primary strut members 177 are at a height to prevent relative forward and aft movement between the pallet P and the apparatus 100 when in superposed relationship.

In one mode of operation, the apparatus 100, with the wheels 171 in their respective second positions p2, and the abutment member 178 in their respective first positions, is inserted under the pallet P (or conversely, the pallet P is moved over the apparatus 100), the effective height of the apparatus 100 being less than height T. When the pallet P is in full overlying relationship with the apparatus 10, such that the front abutment member 178 is in front of the pallet P and the aft abutment member 178 is aft of the pallet P, the two abutment members 178 are actuated (or alternatively manually manipulated) to move to an lock at their respective second positions, thereby effectively longitudinally trapping the pallet P over the apparatus 10. Then, the powered engagement units 170 are actuated to pivot the respective wheels 171 to their first positions p1, frictionally engaging the underside of the pallet P. The powered drive unit 140 can now drive the apparatus 100 together with the pallet P along the cargo path CS to its required position. Optionally, the abutment member 178 that is furthest away from the apparatus 100 prior to commencing the overlying process can be in its second position throughout. In any case, it is to be noted that for this mode of operation, the wheels 171 are not required to rotate per se, and thus in corresponding alternative variations of this example, the wheels 171 can be replaced with friction pads that are selectively deployable and retractable between two positions corresponding to the aforesaid first position p1 and second position p2 of the wheel 171, mutatis mutandis, and operate to selectively provide a frictional engagement with the underside of the pallet P.

In another mode of operation, the apparatus 100, with the wheels 171 in their respective second positions p2, and the abutment member 178 in their respective first positions, is partially inserted under the pallet P (or conversely, the pallet P is moved over the apparatus 100), the effective height of the apparatus 100 being less than height T. When the pallet P is in partial overlying relationship with the apparatus 100, such that the pallet only overlies the nearest part of the apparatus 100 thereto including at least the nearest powered engagement units 170, the powered engagement units 170 are actuated to pivot the respective wheels 171 to their first positions p1, and the wheels 171 of the nearest units 170 frictionally engage the underside of the pallet P. The wheels 171 are also powered to rotate, thereby moving the pallet P in a horizontal direction over the apparatus 100 until the pallet P is in full overlying relationship with the apparatus 10, such that the front abutment member 178 is in front of the pallet P and the aft abutment member 178 is aft of the pallet P. The wheels 171 stop rotation to maintain this relative position between the pallet P and the apparatus 100. The two abutment members 178 are actuated to move to their respective second positions, thereby effectively longitudinally trapping the pallet P over the apparatus 10. Then, with the wheels 171 still at their first positions p1 frictionally engaging the underside of the pallet P, the powered drive unit 140 can drive the apparatus 100 together with the pallet P along the cargo path CS to its required position. Optionally, the abutment member 178 that is furthest away from the apparatus 100 prior to commencing the overlying process can be in its second position throughout.

Figure 6A:
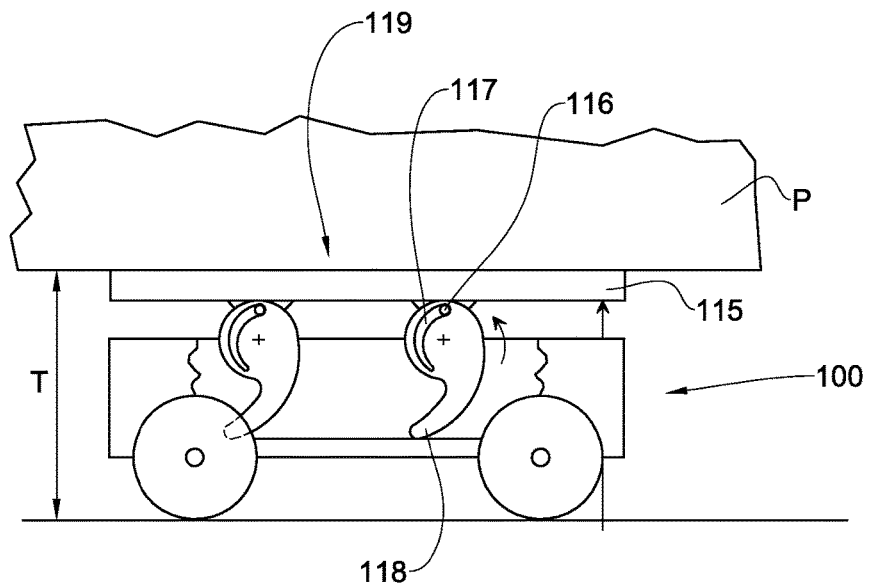
FIGS. 6(a) and 6(b) illustrate in side view an alternative variation of the example of a releasable engagement system of FIG. 3(d).
Figure 6B:
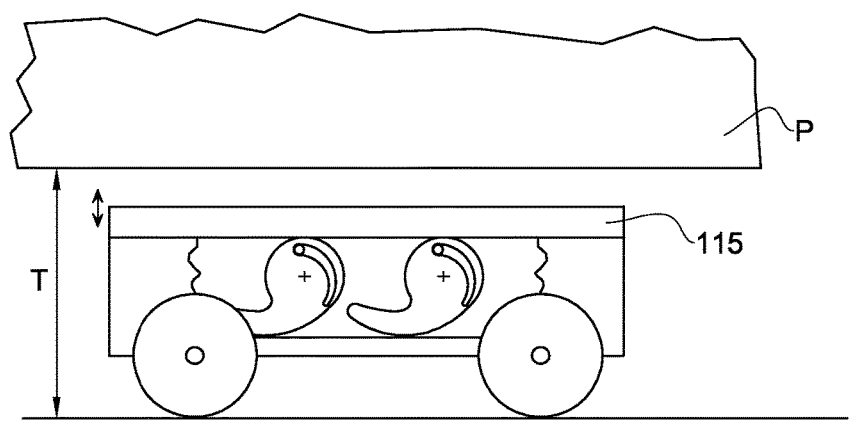

Examples of such a powered engagement unit 170 can include a 3-inch self lifting powered drive unit (PDU) and the 2-inch spring loaded PDU provided by Ancra International LLC of the USA In an alternative variation of this example, and referring to FIGS. 6(a) and 6(b), the releasable engagement system 110 comprises a cam arrangement 119 including a plurality of generally identical cams 118 that are pivotable between a first position and a second position about respective pivot axes by means of a suitable controllable actuator (not shown). The cams 118 each comprise a curved slot 117 in which a pin 116 is engaged, the pins 116 being fixed to a pallet engagement plate 115 which is vertically displaceable with respect to the upper part of the apparatus 100 or the chassis member 141. In the second position, and referring to FIG. 6(b), the cams 118 are rotated to their maximum clockwise position (as seen in this figure) so that the pallet engagement plate 115 is at its lowest position, defining a height for the apparatus less than spacing T. In the first position, and referring to FIG. 6(a), the cams 118 are rotated in an anticlockwise direction (as seen in this figure) so that the pallet engagement plate 115 is raised, increasing the height for the apparatus 100 to at least spacing T, thereby enabling engagement of the underside of the pallet P.

Figure 7:
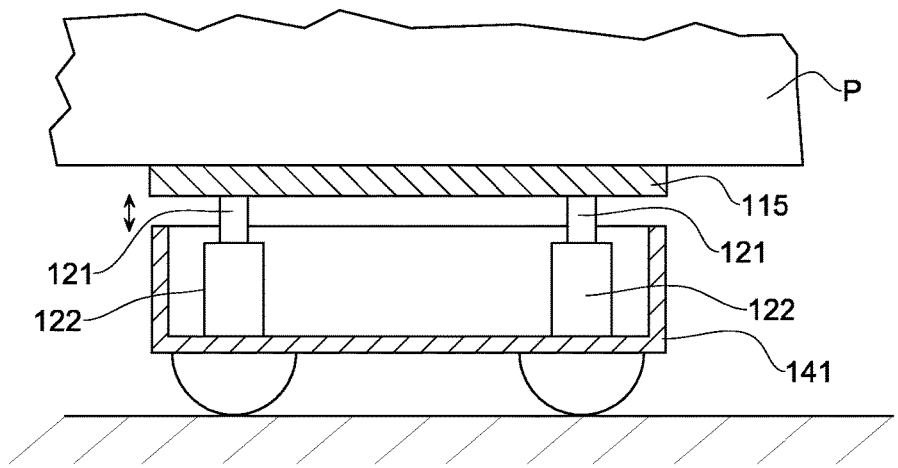
FIG. 7 illustrates in side view an alternative variation of the example of a releasable engagement system of FIG. 3(d).

In an alternative variation of this example, and referring to FIG. 7, the releasable engagement system 110 comprises a jack arrangement including one or more piston members 121 each telescopically displaceable with respect to a respective jack sleeve 122 between a first position and a second position by means of a suitable controllable actuator (not shown), for example hydraulic, pneumatic or mechanical actuators. The free end of the piston members 122 are fixed to a pallet engagement plate 115 which is displaceable with respect to the upper part of the apparatus 100, while the respective jack sleeves 122 are fixed to the chassis member 141. In the second position, the piston members are fully retracted in their respective jack sleeves 122 so that the pallet engagement plate 115 is at its lowest position, defining a height for the apparatus less than spacing T. In the first position, and referring to FIG. 7, the piston members are extended with respect to their respective jack sleeves 122 so that the pallet engagement plate 115 is raised, increasing the height for the apparatus 100 to at least spacing T, thereby enabling engagement of the underside of the pallet P.

Figure 8:
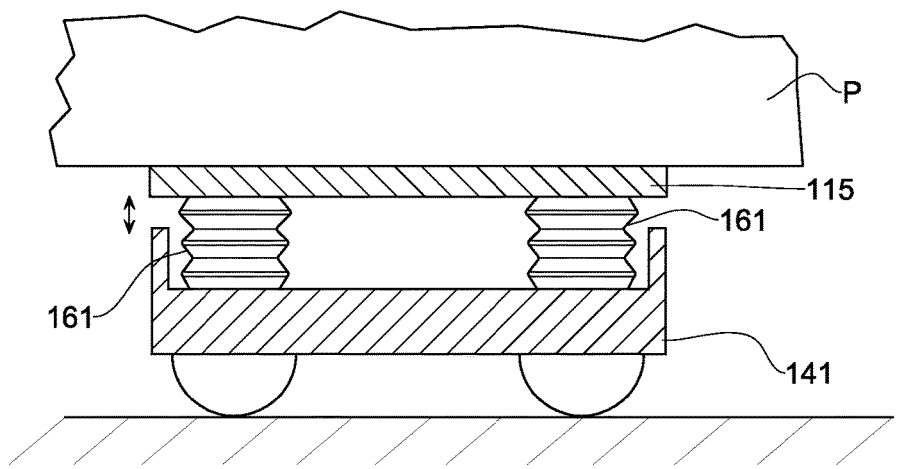
FIG. 8 illustrates in side view another alternative variation of the example of a releasable engagement system of FIG. 3(d).

In an alternative variation of this example, and referring to FIG. 8, the releasable engagement system 110 comprises an inflatable arrangement including one or more bellows-like members 161, each being inflatable between a first height and a second height hydraulically or pneumatically. The upper end of the bellows-like members 161 are fixed to a pallet engagement plate 115 which is displaceable with respect to the upper part of the apparatus 100, while the lower ends of the respective bellows-like members 161 are fixed to the chassis member 141. In the second height, the bellows-like members 161 are fully deflated, or at least sufficiently deflated so that the pallet engagement plate 115 is at its lowest position, defining a height for the apparatus less than spacing T. In the first height, and referring to FIG. 8, the bellows-like members 161 are sufficiently inflated so that the pallet engagement plate 115 is raised, increasing the height for the apparatus 100 to at least spacing T, thereby enabling engagement of the underside of the pallet P.

Figure 9:
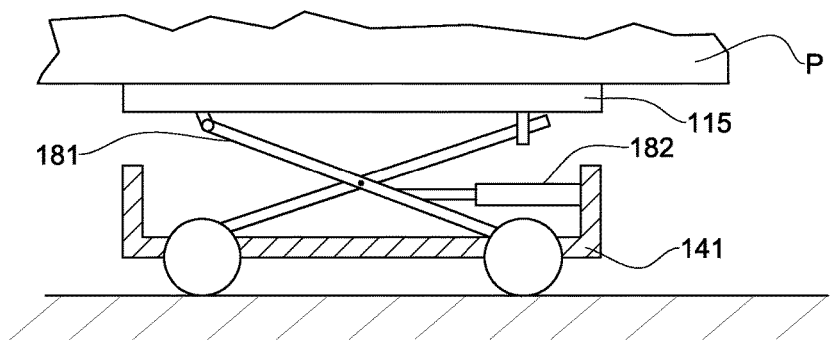
FIG. 9 illustrates in side view another alternative variation of the example of a releasable engagement system of FIG. 3(d).

In an alternative variation of this example, and referring to FIG. 9, the releasable engagement system 110 comprises a scissor lift mechanism 181 controllably movable between a first position and a second position by means of a suitable controllable actuator 182, for example a hydraulic, pneumatic or mechanical actuator. The upper end of the scissor lift mechanism 181 is fixed to a pallet engagement plate 115 which is displaceable with respect to the upper part of the apparatus 100, while the lower end of the scissor lift mechanism 181 is fixed to the chassis member 141. In the second position, the scissor lift mechanism 181 is sufficiently retracted so that the pallet engagement plate 115 is at its lowest position, defining a height for the apparatus less than spacing T. In the first position, and referring to FIG. 9, the scissor lift mechanism 181 is sufficiently extended with so that the pallet engagement plate 115 is raised, increasing the height for the apparatus 100 to at least spacing T, thereby enabling engagement of the underside of the pallet P.

Figure 10A:
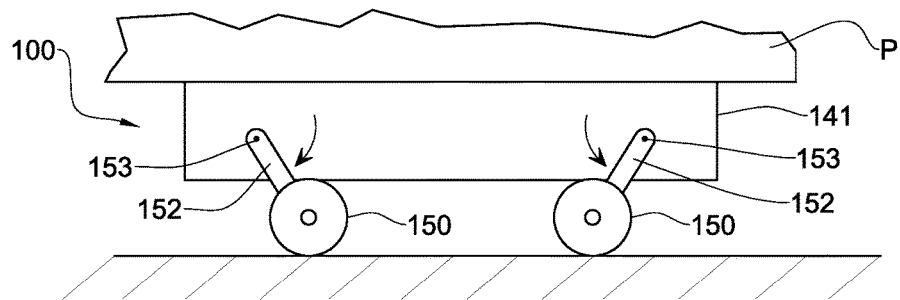
FIGS. 10(a) and 10(b) illustrate in side view another alternative variation of the example of a releasable engagement system of FIG. 3(d).
Figure 10B:
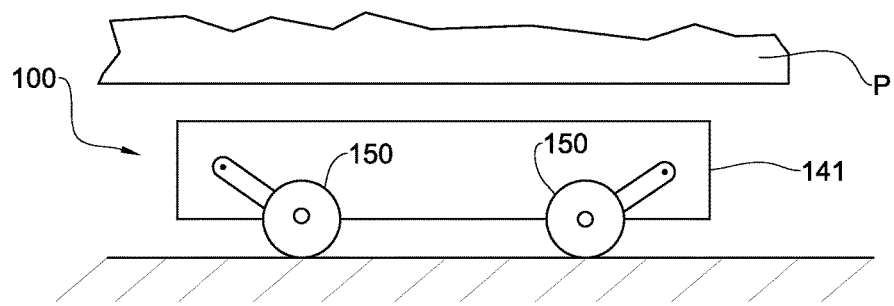

In an alternative variation of this example, and referring to FIG. 10(*a*) and FIG. 10(*b*), the releasable engagement system 110 comprises a mechanical lift arrangement in which the wheels 150 are pivotably mounted to the chassis member 141 via struts 152 that are pivoted to the chassis member 141 at respective pivot axes 153. The struts 152 are controllably movable between a first position and a second position by means of a suitable controllable actuator (not shown). In the second position, and referring to FIG. 10(*b*), the struts 152 are pivoted at a relatively shallow angle with respect to the ground surface (such as the deck D) so that the apparatus 100 is at its lowest position, defining a height for the apparatus less than spacing T. In the first position, and referring to FIG. 10(*a*), the struts 152 are pivoted at a relatively less shallow angle with respect to the ground surface (such as the deck D) so that the apparatus 100 is raised, increasing the height for the apparatus 100 to at least spacing T, thereby enabling engagement of the underside of the pallet P.

Figure 11A:
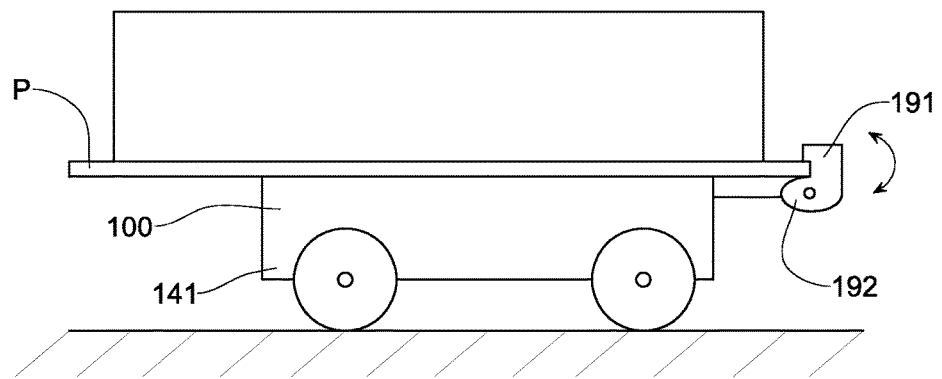
FIGS. 11(a) and 11(b) illustrate in side view another alternative variation of the example of a releasable engagement system of FIG. 3(d).
Figure 11B:
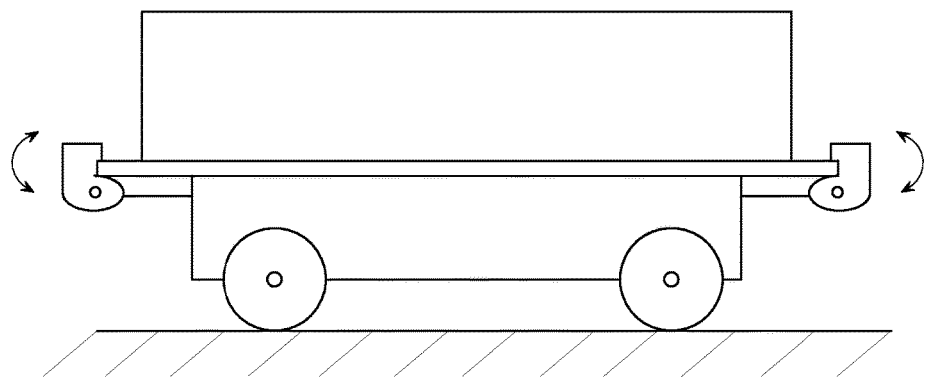

Thus, in the examples illustrated in FIGS. 3(*a*) to 5, and 6(*a*) to 10(*b*), the respective releasable engagement system operate by selectively providing the apparatus with an effective height that is less than spacing T to allow the apparatus 100 to assume a position underneath the pallet P, and by selectively enabling the apparatus to increase its effective height to at least spacing T so that the apparatus becomes partially loaded with the pallet and thus engages the same by friction. In an alternative variation of these examples, and referring to FIG. 11(*a*) the releasable engagement system 110 operates to selectively engage to and disengage from the pallet P via the peripheral lip Q thereof. Thus, in this example, the height of the apparatus 100 remains the same prior to and after engagement with the pallet P, and is less than spacing T to allow the apparatus 100 to assume a position underneath the pallet P. the engagement system in this example is in the form of a clamp 192 at the front end or at the back end of the chassis member 141. The clamp comprises jaws 191 that are pivotable between a first position and a second position by means of a suitable controllable actuator (not shown). In the first position, the clamp is open, and each jaw 191 is pivoted to its lowest position so that no part of the clamp 192 is at a height greater than spacing T. In the second position, and referring to FIG. 11(*a*), the jaws 191 are pivoted over the peripheral lip Q so as to clamp the peripheral lip Q thereby engaging the pallet P. Optionally, two such clamps 192 can be provided, one each at the front end and at the back end of the chassis member 141, as illustrated in FIG. 11 (*b*).

Referring again to FIGS. 3(*a*) to 3(*c*), the wheels 150 on one side 142 of the chassis member 141 are parallel to the wheels 150 on the other side 142 of the chassis member 141. Thus the wheels 150 rotate together in one direction or the other direction to move the apparatus 100 forwards or backwards along the respective cargo path CS.

In this example, the guiding system 300 is passive, and comprises a pair of laterally spaced guide rails 310 which are configured for passively guiding the path of the apparatus 100 forwards and backwards along the respective cargo path CS. The apparatus 100 is thus restricted to rectilinear movement constrained by rails along the respective cargo path CS.

As best seen in FIGS. 4 and 5, each guide rail 310 has a U-shaped cross-section for accommodating parts of the rims of wheels 150 (on the respective side 142 of the chassis member 141) that are in contact therewith as the wheels roll on the guide rails 310, and for constraining the rolling motion of the wheels with respect thereto. The guide rails 310 are located inboard of the rails 220. The guide rails 310 are configured for supporting the weight of the apparatus 100, and in some examples also are configured for supporting part of (not including a majority of) the weight of the pallet P plus its cargo, when the pallet P is propelled by the apparatus 100 along the respective cargo storage path CS. Accordingly, each guide rail 310 is on or close to the respective load bearing beam B of the freight deck D so that the weight of the apparatus 100 (and optionally part of the weight of the pallet and cargo) is supported by the respective load bearing beam B without damaging the floor of the freight deck D.

In alternative variations of this example, the guide rails 310 are configured for supporting the majority of the weight of the apparatus 100, and the weight of the pallet P plus its cargo, when the pallet P is propelled by the apparatus 100 along the respective cargo storage path CS.

In alternative variations of this example, the guide rails 310 are configured for supporting all of the weight of the apparatus 100 plus the weight of the pallet P and its cargo, when the pallet P is propelled by the apparatus 100 along the respective cargo storage path CS. In such cases, the support system 200 can optionally be omitted from the system 10.

In alternative variations of this example, two sets of separate load bearing beams (not shown) are provided in the freight deck for each cargo storage path CS. One set of load bearing beams are for carrying the load from each set of rails 220, and the other set of load bearing beams are for carrying the load from guide rails 310, both of which can in close proximity to one another.

In any case, the powered drive unit 140 is electrically powered to enable the apparatus 100 to be selectively moved up and down the respective cargo storage path CS to any desired position thereon. In this example, and referring again to FIG. 2, the electrical power is provided by a battery carried by the apparatus 100, and the battery is configured for being recharged in one or more of an automated, automatic and manual manner, via recharging system 500. Recharging system 500 comprises a recharger docking station 550, provided near the area S at the rear end of the guiding system 300 of the respective cargo storage path CS, and a docking head 580 provided at rear end 146 of the apparatus 100, facing the area S. A first set of electrical terminals are provided at docking head 580, and electrically connected to the battery. A second set of electrical terminals are provided at docking station 550, and electrically connected to a power supply of the aircraft AC, or to an external power supply, routed via the aircraft AC. The docking head 580, docking station 550, and the first and second sets of electrical connections have mating structures such as to ensure that when the apparatus 100 approaches the area S and docking head 580 docks with the docking station 550, the first set of electrical terminals establish electrical connection with the second set of electrical terminals, enabling the battery to be recharged.

The apparatus 100 can be docked to the docking station 550 manually, i.e., by manually controlling the apparatus 100 via controller 160 to approach and dock with the docking station 550 whenever desired. Alternatively, the apparatus 100 can be docked to the docking station 550 automatically, i.e., by controlling the apparatus via controller 160 to approach and dock with the docking station 550 at the beginning of each loading or unloading cycle. Alternatively, the apparatus 100 can be docked to the docking station 550 autonomously, i.e., wherein the controller 160 controls the apparatus 100 to approach and dock with the docking station 550 according to pre-established criteria, for example where the power levels in the battery have reached a minimum acceptable level.

Additionally or alternatively, the electrical power is provided by a battery carried by the chassis member 141, but the battery is connected to a power source in the aircraft or outside of the aircraft via electrical cables that are wound on a spool and carried either by the apparatus 100 or located on the freight deck, and the cable is spooled in or out according to the location of the apparatus 100 in the respective cargo path CS and thus the respective spacing between the apparatus 100 and the power connection in the freight deck. This set up allows the battery to be recharged continuously or as required, and independently of the position of the apparatus 100. Alternatively, no battery is carried by the apparatus 100. Rather, power is routed directly to the apparatus 100 from a power source in the aircraft or outside of the aircraft via electrical cables that are wound on a spool and carried either by the apparatus 100 or located on the freight deck, and the cable is spooled in or out according to the location of the apparatus 100 in the respective cargo path CS and thus the respective spacing between the apparatus 100 and the power connection in the freight deck.

Figure 20:
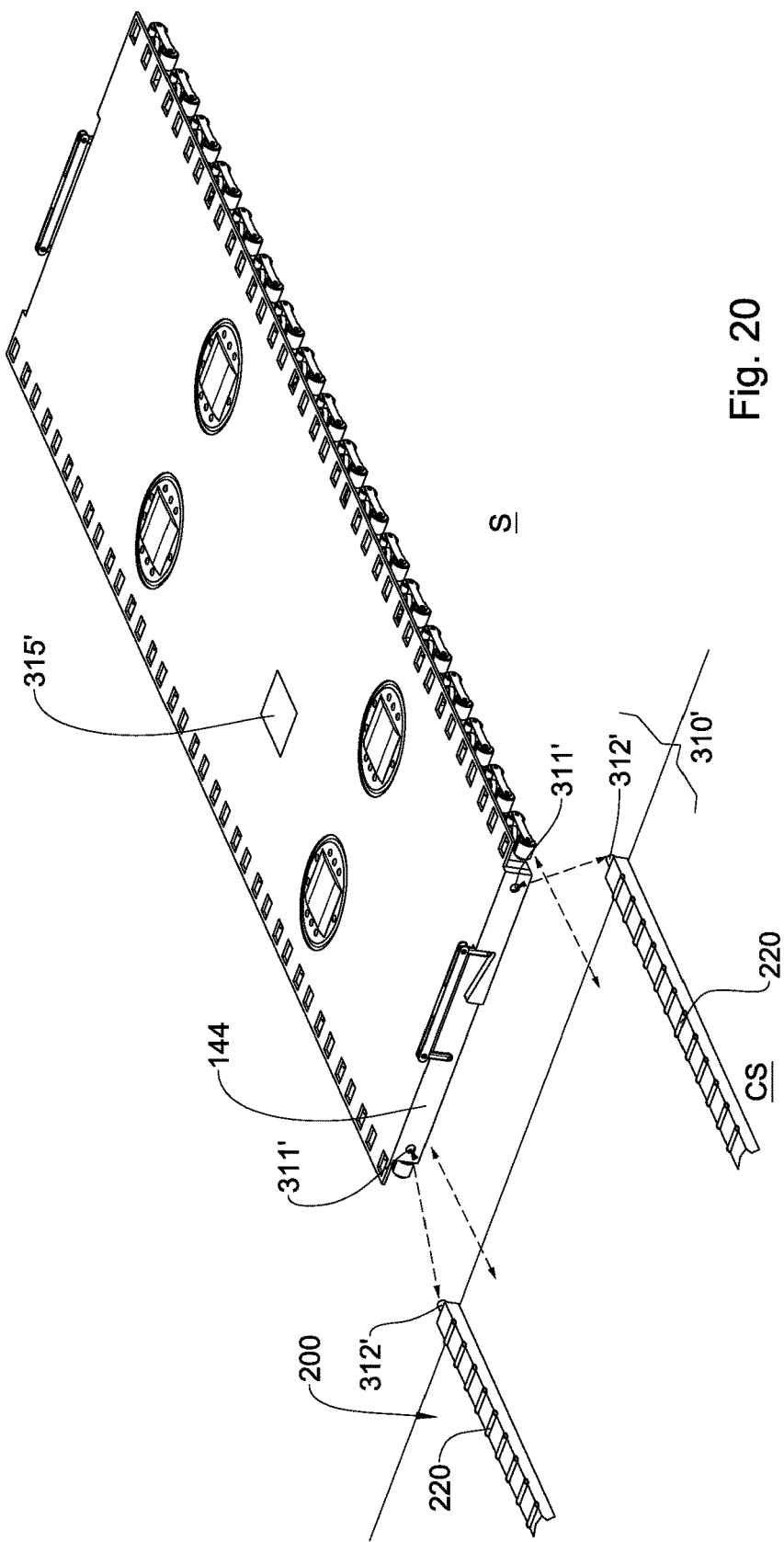
FIG. 20 is a top isometric view of an alternative example of the guiding system of the cargo handling system example of FIG. 2.

In alternative variations of this example, and referring to FIG. 20, the guiding system 300 is an active guidance system, and comprises an optical guidance system 310', and does not require the guiding rails 310, which can thus be optionally omitted. The optical guidance system 310' comprises optical sensors 311', mounted on the left and right sides of the front end 144 of the mobile transport apparatus 100 that faces the end of rails 220. The optical guidance system 310' further comprises optical emitters 312', located at the end of the rails 220 facing the area S. The optical emitters 312' at each end of the two rails 220 emit light at the same intensity towards area S, and when the optical sensors 311' are at least partially facing the optical emitters 312', each sensor receives light emitted from one or both emitters 312'. However, the intensity of light received by each of the optical sensors 311' will be the same only when the mobile transport apparatus 100 is aligned with the rails 220. Prior to such alignment, and depending on the degree of misalignment, each optical sensor 311' will detect different intensities of light. The controller 315' is configured for analyzing the difference in intensities and controls movement of the mobile transport apparatus 100 in response thereto in an effort to equalize the intensities, and thereby align the mobile transport apparatus 100. Such optical guidance systems 310' are known in the art. Controller 160 can act as controller 315', or can be different from controller 315'.

As already mentioned, the controller 160 is configured for controlling movement of the apparatus 100 with respect to the freight deck D, in particular with respect to the respective cargo path CS. In this example, the controller 160 comprises computer control for controlling the movement of the apparatus 100 in an automated or semi-automated manner. For this purpose, the system 10 further optionally comprises sensors (not shown) to determine the position of the apparatus 100 within its respective cargo path CS, and the location of any pallets P already secured in their desired positions on the cargo path CS.

In alternative variations of this example, the controller 160 is a manual control for controlling the movement of the apparatus, and thus an operator manually operates the apparatus, using suitable control switches/devices in a control box, operatively connected to the apparatus 100 via wires.

In alternative variations of this example, the controller 160 operates as manual control for controlling the movement of the apparatus, and thus an operator manually operates the apparatus, using suitable control switches/devices in a control box, operatively connected to the apparatus 100 via wireless remote control, and thus controller 160 comprises a wireless remote control system including a suitable signal receiver (and optionally signal transmitter) system for receiving signals from the operator (and optionally transmitting signals to the operator, for example relating to operation of the apparatus 100). The operator can be in the aircraft itself, or in a completely remote location, and can monitor operation of the system 10 via cameras installed in the aircraft, for example.

The locking devices 400 are located on the freight deck D and are configured for selectively releasably locking each pallet P with respect to the freight deck D. Such locking devices are well known in the art and will not be described in further detail herein. In the example illustrated in FIG. 2, there is an outboard set of locking devices 400 for each of the cargo storage paths CS1, CS2, CS3, CS4, for laterally locking the pallets P on the outboard sides thereof, a set of locking devices 400 located between cargo storage paths CS1, CS2, and also located between cargo storage paths CS3, CS4, for laterally locking the pallets P on the inboard sides thereof, plus additional locking devices 400 on the freight deck D and/or comprised on the cargo support system 200, for locking the pallets P in a forward and aft direction for each respective cargo path CS.

The pallet turning and alignment area S in this example is similar to such arrangements in conventional CHS, and comprises turning/alignment devices, for example a plurality of ball transfer units (BTU) set on the floor of the freight deck, together with PDU's that are also pivotable about respective vertical axes. This arrangement enables any pallet entering area S via the cargo door CD to be autonomously and/or automatically manipulated over the area S, adjusting its position and orientation thereon, until the pallet is aligned with the desired cargo path CS. In alternative variations of this example, the turning and alignment area S in this example comprises a plurality BTU's set on the floor of the freight deck, but without PDU's, and the pallets P can be manually manipulated over the BTU's and into alignment with the desired cargo path CS.

In any case, it is to be noted that top of the rollers 230 of the cargo support systems 200 are at the same height as the tops of the BTU's (and PDU's) of the area S, with respect to the freight deck D. This enables the pallets P to be transferred between cargo support system 200 and the area S smoothly and with the pallets P being maintained level.

One mode of operation of system 10 for loading a plurality of pallets P in the freight deck D is as follows.

First, a pallet P supporting a cargo unit is loaded from outside of the aircraft AC into the area S via the cargo door CD in a conventional manner. Then, the pallet P is manipulated on area S also in a conventional manner to align the pallet P with a particular cargo path CS, for example cargo storage path CS1, and the pallet P is moved onto the respective rails 220 of the cargo support system 200 at a portion thereof abutting the area S. If the respective apparatus 100 is not already in position beneath the pallet P, it is selectively moved into such a position by moving apparatus 100 towards this position along the guide rails 310.

Next, the apparatus 100 engages the pallet P via the respective releasable engagement system 110, and then the powered drive unit 140 drives the apparatus 100 together with the pallet P along the cargo path CS to its required position. In other words, in operation the apparatus 100 effectively carries the pallet P over the freight deck to a desired location thereon, though while the pallet P is being thus transported on the rails 220, most or all of the weight of the pallet P, and of course the cargo thereon, is being supported by the respective cargo support system 200.

If this is the first pallet P that is being processed along cargo path CS1, then its position is typically chosen to be at the far, forward end of the cargo path CS1, closest to the nose of the aircraft AC (alternatively any other position can be chosen along the cargo path CS1), and the pallet P is locked in place via the respective locking devices 400. If there is another pallet at this position already, the current pallet P is moved to a position immediately aft thereof via the apparatus 100 (alternatively to any other position along the cargo path CS1 between the prior pallet and the area S), and then locked in place via the respective locking devices 400.

Once the pallet P is locked in place, the apparatus 100 is disengaged from the pallet P by disengaging the releasable engagement system 110, and the apparatus is then moved back towards area S to engage with and transport the next pallet P to the next position along the storage path CS1, in a similar manner to the first pallet, mutatis mutandis, after which the pallet is locked in position.

This procedure can be repeated until the storage path CS1 has been filled with the desired number of pallets P, up to its full capacity. The other storage paths CS2, CS3, CS4, can be provided with pallets P in a similar manner to that described for storage path CS1, mutatis mutandis, each concurrently therewith (using additional apparatuses 100), or in any desired sequence (for example using the same apparatus 100 or using separate apparatuses 100, one for each cargo path CS).

Unloading the pallets from the freight deck D comprises the same steps as loading, but in reverse.

Figure 2C:
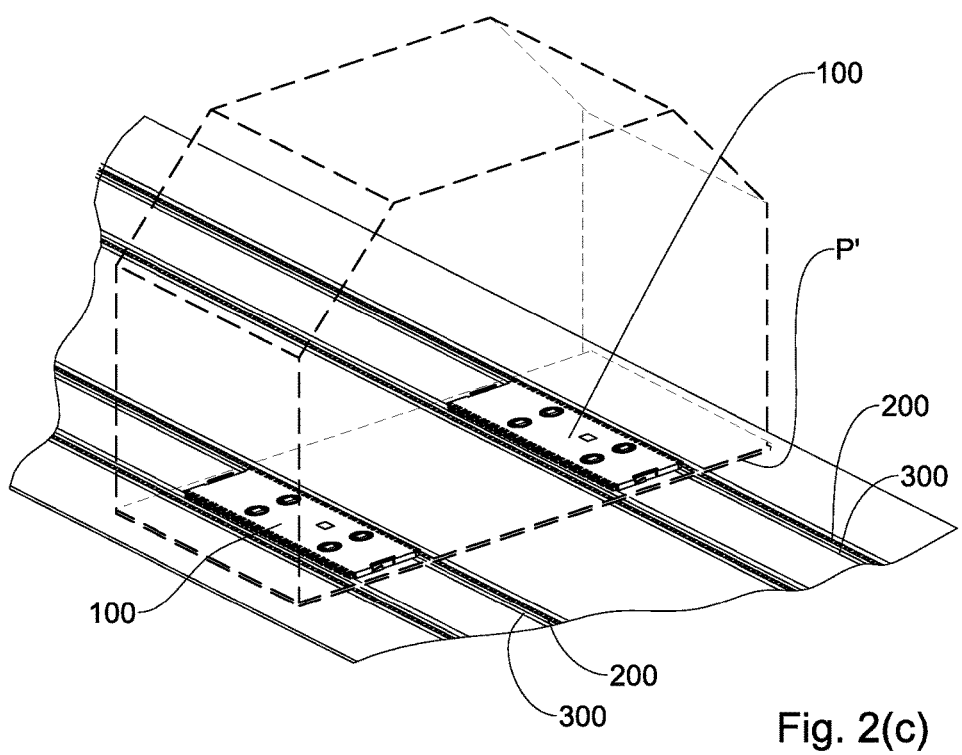
FIG. 2(c) is a partial isometric view of the example of FIG. 2 used with one wide cargo unit using two mobile transport apparatuses in side-by-side relationship, shown without the wide cargo unit in FIG. 2(d).
Figure 2D:
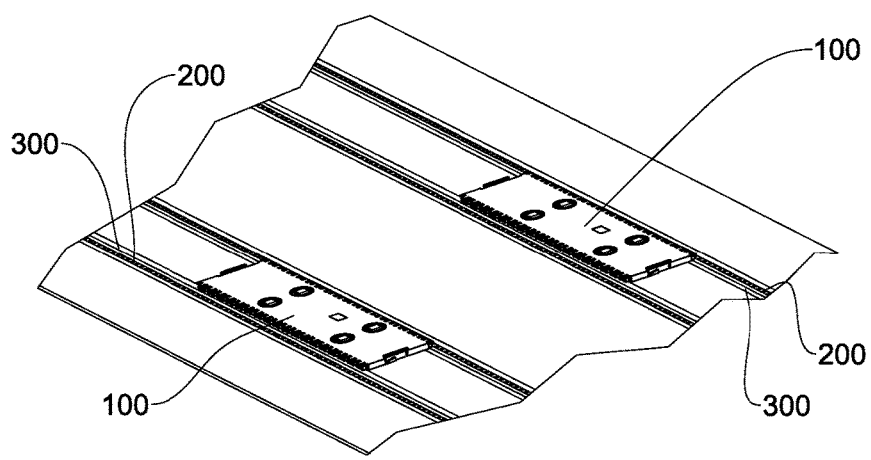
FIG. 2 is a plan view of a cargo handling system according to a first example of the presently disclosed subject matter.
FIG. 2(a) is a plan view of a cargo handling system according to a variation of the example of FIG. 2.

Such cargo storage paths CS as illustrated in FIG. 2 assume that the pallets P are of a suitable size to fit within less than a half-width of the freight deck D. However, the system 10 can also be used with pallets P that are configured having a width that is greater than a half-width of the freight deck D. For example, and referring to FIGS. 2(c) and 2(d), pallets P' having a width that overlies the width of two juxtaposed cargo storage paths CS1, CS3 (or alternatively one or both of cargo storage paths CS2, CS4, mutatis mutandis) can be transported by concurrently using two apparatuses 100, one in each of the respective cargo storage paths CS1, CS3 also in juxtaposed configuration. The two apparatuses 100 together transport the wide pallet P' (with its cargo load) while this is being partially or fully supported over the two respective cargo support systems 200, and the apparatuses 100 are being guided each by its respective guiding system 300.

In alternative variations of this example, and referring to FIG. 2(a), one or both of cargo storage paths CS1, CS3 (or alternatively one or both of cargo storage paths CS2, CS4) can deviate from parallel to the aircraft centerline CL where the cross-section of the aircraft begins to significantly decrease towards the nose and tail of the aircraft, respectively, allowing one or more single pallets P to be accommodated in these regions one behind the other, where pairs of such pallets in side-by-side arrangement could not fit. In such examples, at least some of the wheels 150 are rotatably mounted to the sides 142 via mountings that are pivotable about a vertical axis, allowing the apparatus 100 to travel along the curved portions 390 of the guiding system 300 corresponding to these deviations. Alternatively, the top 148 is pivotable about a vertical axis with respect to the chassis member 141.

In yet other alternative variations of this example, the aircraft AC is configured for receiving the pallets P via the nose or tail of the aircraft, and thus the respective cargo handling system does not require the aforesaid pallet turning and alignment area S located on the respective freight deck D. Furthermore, cargo storage paths CS1, CS3 can be contiguous, and cargo storage paths CS2, CS4 can also be continuous. In such an example, the pallets P are loaded from the nose opening or tail opening of the aircraft, and the first pallet is transported by the apparatus to the other end of the respective cargo storage path CS, and after the pallet has been locked in place the apparatus 100 returns to the nose opening or tail opening to then transport another pallet along the respective cargo storage paths CS, and so on for the other pallets.

In yet other alternative variations of this example, the apparatus 100 can be configured for providing a rotational displacement to the cargo unit with respect to the chassis member 141 about a vertical axis. For example, the releasable engagement system 110 can be in the form of PDU's that are pivotable about a vertical axis. Alternatively, a turntable is mounted onto the top 148 of the chassis member 141, and the cargo unit is supported over the turntable. This feature allows for the orientation of the cargo unit to be controlled independently of the direction of motion of the apparatus 100, and can facilitate alignment of the cargo unit on the support structure, for example.

Figure 13:
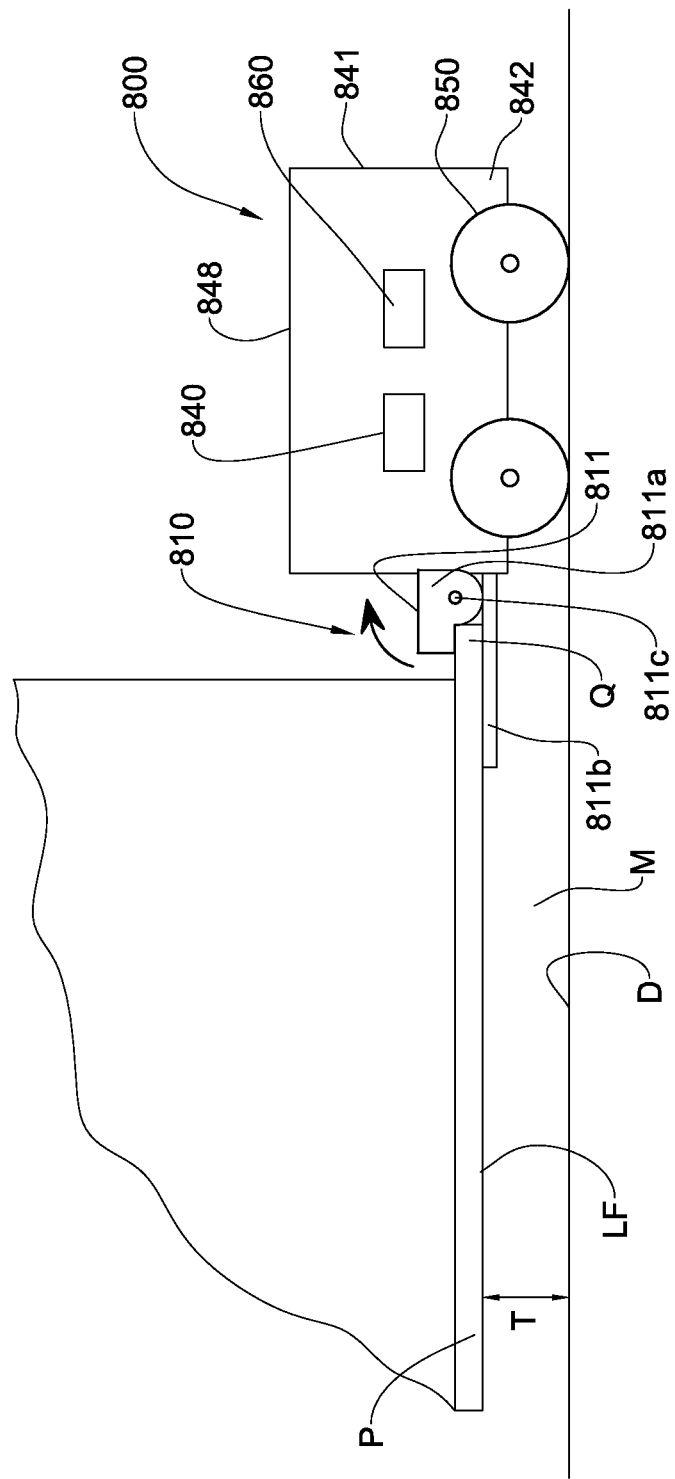
FIG. 13 is a side view of an example of a transport apparatus comprised in the cargo handling system example of FIG. 12.

Referring to FIG. 13, a second example of the apparatus, designated 800, has the elements and functions of the apparatus 100 as described herein, mutatis mutandis, with some differences as will become clearer herein. In this example the apparatus 800 is mobile and has a maximum height that is not restricted to spacing T. Thus, the apparatus 800 cannot fit under a pallet P i.e., the apparatus 800 is not configured for being accommodated in the space M between the lower face LF of the pallet P and the freight deck D, although parts of the apparatus 800 can indeed enter the space M during operation thereof.

Rather, apparatus 800 is configured for being selectively affixed to a pallet P and for assuming a position forward or aft of the pallet P, enabling the apparatus 800 to push and/or pull the pallet P along the desired cargo storage path CS, to its position thereon, after which the pallet P can be deposited and affixed in place, and the apparatus 800 can then disengage from the pallet P and move away therefrom.

Apparatus 800 thus comprises a releasable engagement system 810, a powered drive unit 840 and a controller 860, similar to releasable engagement system 110, a powered drive unit 140 and a controller 160 of the first example, mutatis mutandis. In this example, the apparatus 800 is configured for selectively transporting each pallet P, one at a time, while each respective pallet P is in juxtaposed forward-aft relationship therewith.

The releasable engagement system 810 is configured for selectively engaging and for selectively disengaging the apparatus 800 with respect to each pallet P, in operation of the respective cargo handling system 10'. The powered drive unit 840 is configured for selectively moving the apparatus 800 over the freight deck D to a plurality of locations thereon along the respective cargo path CS, and for concurrently propelling the respective pallet P to at least one such location when the apparatus 800 is engaged to the pallet P via the engagement system 810. The controller 860 is configured for controlling movement of the apparatus 800 with respect to the freight deck D, in particular with respect to the respective cargo path CS.

The powered drive unit 840 is similar to powered drive unit 140, except that it can be relatively taller, not being constrained by the height limitation of height T, facilitating accommodation in the drive unit 840 of relatively larger motors, gears, and other equipment for operation thereof. As with the first example, the powered drive unit 840 has a chassis member 841 and comprises two lateral sides 842, each inboard of and facing the respective rails 820, and comprises a plurality of wheels 850 rotatably mounted to each lateral side 842. The wheels 850 are operatively connected to one or a plurality of motors (not shown) housed in the chassis member 841 to provide motive power to the wheels 850, which in operation roll over the flight deck D to displace the powered drive unit 840 and thus the apparatus 800 with respect thereto, while being guided by the laterally spaced guide rails 310 of guiding system 300 forwards and backwards along the respective cargo path CS.

In this example, releasable engagement system 810 does not require to provide a clearance between the top 848 thereof and the lower face LF of the pallet P. Rather, the engagement system 810 is configured to enable the apparatus 800 to selectively engage to and disengage from the pallet P when the apparatus 800 is in juxtaposed relationship therewith, and, when engaged, for both the apparatus 800 and the pallet P to move together propelled by the powered drive unit 840. In other words, in operation the apparatus 800 tows the pallet P over the freight deck to a desired location thereon.

In this example, the engagement system 810 comprises a clamping system 811 configured for selectively clamping the lip Q of the pallet P. For example, clamping system 811 comprises upper and lower clamping members or jaws 811*a*, 811*b* pivotable about axis 811*c* to selectively clamp the jaws 811*a*, 811*b* to the lip Q of the pallet P. Alternatively, and referring to FIG. 13(*a*), the engagement system 810 can be in the form of a fork-lift arrangement, comprising forks 812 that are vertically movable by means of mast 814 between a disengaged position and an engaged position. In the disengaged position, the forks 812 are spaced from the freight deck D by a spacing less than spacing T, allowing the forks 812 to be inserted into space M so that the pallet P is in overlying relationship therewith. In the engaged position the forks 812 are spaced from the freight deck D by a spacing equal to or just greater than spacing T to enable the forks 812 to abut against the underside LF of the pallet and become partially load-bearing, thereby engaging the pallet P.

Figure 12:
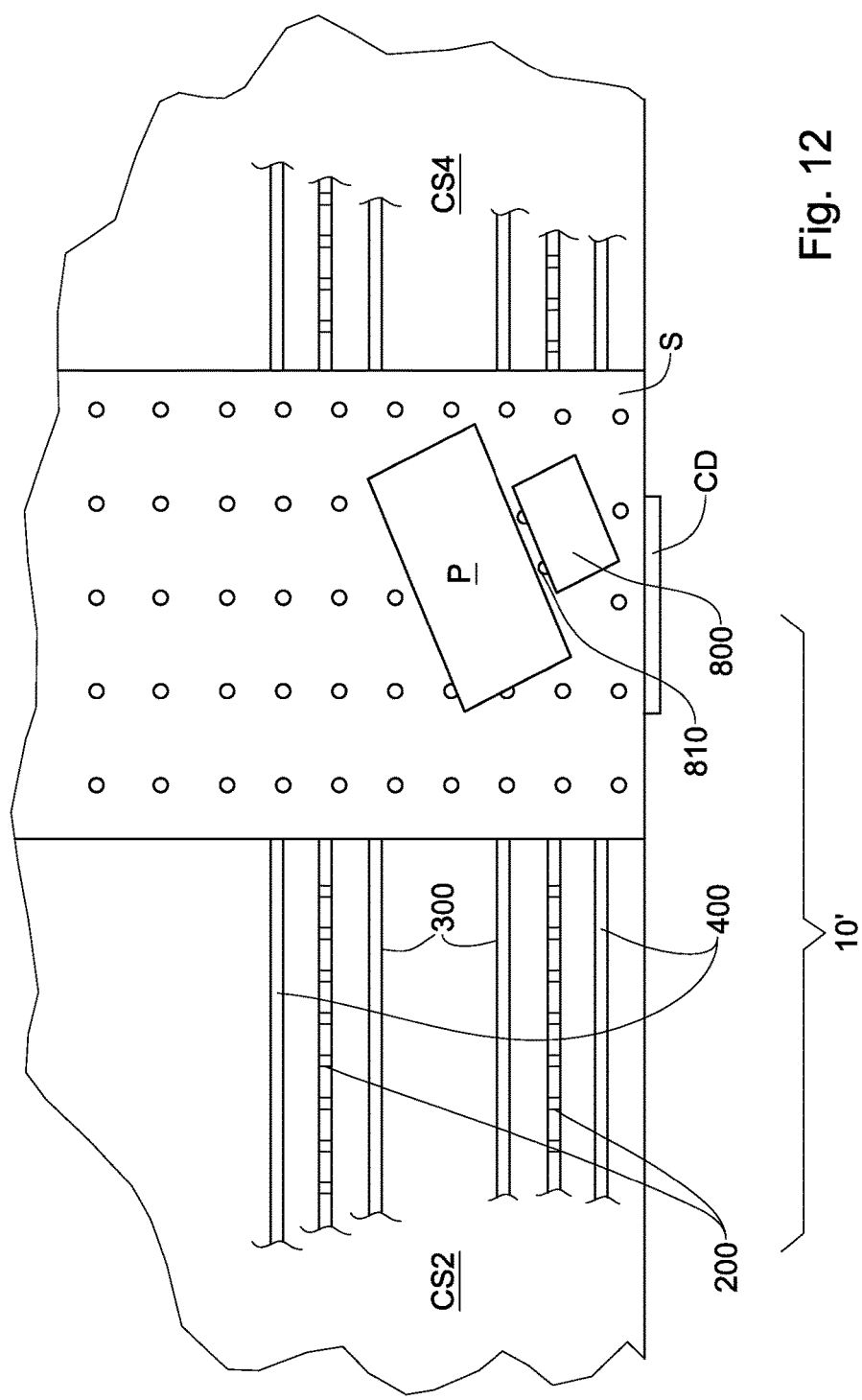
FIG. 12 is a partial plan view of a cargo handling system according to a second example of the presently disclosed subject matter.

In the second example the transport apparatus 800 essentially replaces the transport apparatus 100 in a second example of the cargo handling system 10'. Thus, and referring to FIG. 12, cargo handling system 10' comprises one or more transport apparatus 800, the cargo support system 200, the guiding system 300 (active or passive), and the plurality of locking devices 400 located on the freight deck D, and as with the first example, each cargo unit comprises or is carried on a respective pallet P, with respect to a cargo storage path CS defined on the freight deck D of an aircraft AC.

System 10' can be operated in a similar manner to the first example of system 10, with some differences, mutatis mutandis.

Thus, in one mode of operation, a pallet P supporting a cargo unit is loaded from outside of the aircraft AC into the area S via the cargo door CD and is manipulated on area S to align the pallet P with a particular cargo path CS, for example cargo storage path CS1, for example as disclosed above for the first example, mutatis mutandis. The pallet P is moved onto the rails 220 of the respective cargo support system 200 at a portion thereof abutting the area S. Until this point, the respective apparatus 800 is in a parked position spaced away from the pallet P, for example at a location in area S or another part of the flight deck D, for example the cargo path CS that is on the other side of area S and longitudinally aligned therewith. For this purpose, the guide rails 310 can extend into area S and optionally be contiguous with the guide rails 310 of the longitudinally aligned cargo path CS. For example, the guide rails 310 of cargo path CS1, CS3 are contiguous and span the area S, and/or the guide rails 310 of cargo path CS2, CS4 are contiguous and span the area S. Once the pallet P is supported on the rails 220 and is abutting the area S, the respective apparatus 800 is moved into position behind the pallet P in area S, guided thereto by the extended guide rails 310.

Next, the apparatus 800 engages the pallet P via the respective releasable engagement system 810, and then the powered drive unit 840 drives the apparatus 800 together with the pallet P along the cargo path CS in a direction radiating away from the area S to its required position, while the apparatus 800 is guided along the desired path via guiding system 300. While the pallet P is being thus transported, most or all of the weight of the pallet P, and of course the cargo thereon, is being supported by the respective cargo support system 200. The pallet P is then deposited at the desired position and locked in place via the respective locking devices 400. The apparatus 800 is then disengaged from the pallet P by disengaging the releasable engagement system 810, and the apparatus 800 is then moved back to its parking position in area S to engage with and transport the next pallet P to the next position along the respective storage path CS, after which the pallet is locked in position. This procedure can be repeated until the storage path CS has been filled with the desired number of pallets P up to its full capacity. Each one of storage paths CS1, CS2, CS3, CS4, can be provided with pallets P in a similar manner, mutatis mutandis, each concurrently with one another, or in any desired sequence.

Unloading the pallets from the freight deck D comprises the same steps as loading, but in reverse.

In an alternative variation of the second example, and referring to FIG. 13(b), the apparatus 800 comprises a releasable engagement system 810 at each one of its forward and aft ends. Thus one such apparatus 800 can be used for transporting pallets P for one or another of each pair of longitudinally aligned storage paths—for example storage paths CS1, CS3, or storage paths CS2, CS4. The forward-located engagement system 810 selectively engages with pallets P that are to be transported along and retained in storage path CS1 (or storage path CS2), being moved in a direction towards the nose of the aircraft during loading, and in a direction towards the area S during unloading. Similarly, the aft-located engagement system 810 selectively engages with pallets P that are to be transported along and retained in storage paths CS3 (or storage paths CS4) being moved in a direction towards the tail of the aircraft during loading, and in a direction towards the area S during unloading. In such an example, a recharging system can be provided, comprising a recharger docking station and a docking head, similar to the aforesaid recharging system 500, recharger docking station 550, and docking head 580, mutatis mutandis. For example, the recharger docking station can be at or near the front and/or rear of the aircraft, close to respective end(s) of the guiding system 300 of one or more cargo storage path CS, and can be reached by the apparatus 800 when there are no pallets P in the respective storage path CS. In another example, the recharger docking station can be provided anywhere on the freight deck, and is retractable with respect to the floor of area S to enable the apparatus 800 to move over the retract recharger docking station when the latter is not being used. The docking head can be provided at rear end and/or at the front end of the apparatus 800, for example.

The cargo handling system according to the first and second examples can optionally be provided as a retrofit in at least some existing freight aircraft that already incorporate a conventional powered CHS. For example, such retrofit can proceed as follows. All the PDU's of the conventional powered CHS that are located in the straight track, forward and aft of the respective area S are removed. However, the current rails onto which the pallets are supported while being moved into their respective final positions are used as the support system 200, and the existing locking devices are retained and are used as the locking devices 400. This leaves a spacing between the lower face LF of the pallet P and the freight deck D, corresponding to space M. One or another of the apparatuses 100 or 800 can then be provided for shuttling between the area S and the final desired positions of the pallets P along the respective storage paths, and the respective guiding system 300 is installed on the freight deck D, for example between the aforesaid rails. The guide rails 310 can have a pitch (corresponding to the pitch of the wheels of the apparatus 100 or 800) that places them close to the aforesaid rails and thus close to the respective underfloor support beams. However, if necessary, additional support can be provided for the guiding system 300, for example via additional load bearing beams provided under the floor of the freight deck D. However, particularly where the second example of the apparatus 800 is being used, the weight of the pallet P (plus cargo) is still mainly supported by the aforesaid rails, so the fright deck between the rails only requires to be able to support the weight of the apparatus 800. In such a retrofit, the BTU's and/or rotatable PDU on the respective area S, i.e. the pallet turning section next to the aircraft side door (cargo door) operate conventionally, and then each apparatus 800 only transports the pallets along the respective longitudinal track along the aforesaid rails.

In alternative variations of this example, the controller 860 operates as manual control for controlling the movement of the apparatus 800, and thus an operator manually operates the apparatus, using suitable control switches/devices in a control box, operatively connected to the apparatus 800 via wireless remote control, and thus controller 860 comprises a wireless remote control system including a suitable signal receiver (and optionally signal transmitter) system for receiving signals from the operator (and optionally transmitting signals to the operator, for example relating to operation of the apparatus 800). The operator can be in the aircraft itself, or in a completely remote location, and can monitor operation of the system 10' via cameras installed in the aircraft, for example.

Figure 15:
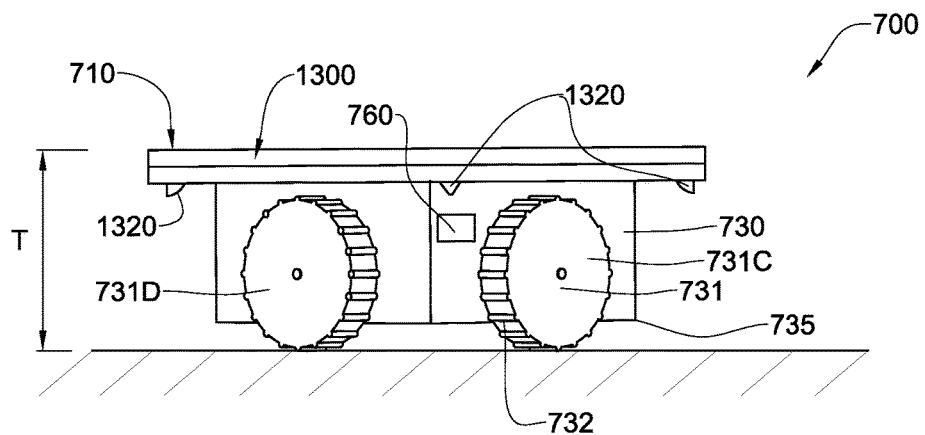
FIG. 15 is a side view of an example of a transport apparatus comprised in the cargo handling system example of FIG. 14
Figure 16:
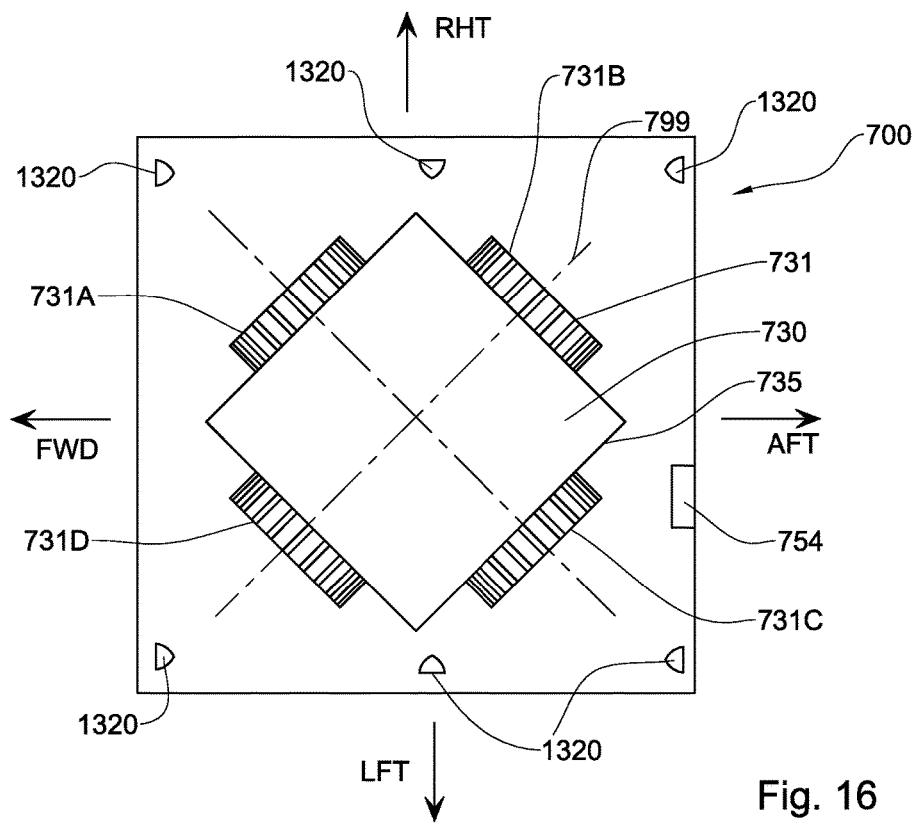
FIG. 16 is a bottom view of transport apparatus example of FIG. 15.

Referring to FIGS. 15 and 16, a third example of the apparatus, designated with the reference numeral 700, is mobile and comprises the elements and functions of the apparatus 100 as disclosed herein, mutatis mutandis, with some differences as will become clearer herein. In this example the apparatus 700 has a maximum height that is similarly restricted to spacing T, and the apparatus 700 is thus configured to fit under a pallet P, i.e., the apparatus 700 is accommodated in the space M between the lower face LF of the pallet P and the freight deck D.

The apparatus 700 differs from apparatus 100 mainly in that apparatus 700 is configured for being controllably steered over the freight deck D with respect to more than one translational degrees of freedom and/or one or more rotational degrees or freedom over the freight deck, and is not restricted to rectilinear movement constrained by rails. Referring to FIG. 14, the corresponding cargo handling system 20 thus comprises one or more transport apparatus 700, as well as a cargo support system 1200, a guiding system 1300, and a plurality of locking devices 1400 located on the freight deck D. As with the first example, each cargo unit comprises or is carried on a respective pallet P, with respect to a cargo storage path CS defined on the freight deck D of an aircraft AC. In particular, it is to be noted that the system 20 does not require to have, but nevertheless can optionally have, the turning/aligning devices (for example BTU's and/or pivotable PDU's) in the pallet turning and alignment area S, and thus such turning/aligning devices can optionally be omitted. On the other hand, area S is provided with spacer blocks 770, having rollers thereon at the same height from the freight deck D as the rollers of the support rails 1220, and in spaced relationship. The spacer blocks 770 are located just inside of the cargo door CD, and allow an apparatus 700 to be parked in-between the spacer blocks 770, while a pallet P is supported on the spacer blocks 770 just inside the area S when the pallet P is first introduced into the freight deck D via the cargo door.

Apparatus 700 thus comprises a releasable engagement system 710, a powered drive unit 730 and a controller 760. The releasable engagement system 710 and the controller 760 are respectively similar to releasable engagement system 110 and controller 160 of the first example and/or alternative variations thereof, mutatis mutandis, and will not be described further. In this example, the apparatus 700 is configured for selectively transporting each pallet P, one at a time, while each respective pallet P is in overlaying relationship with the apparatus 700. According to the third example of the presently disclosed subject matter, two transport apparatuses 700 can be used together in side-by-side spaced relationship to transport a very wide pallet, for example of the kind illustrated in FIG. 2(c).

In this example, and referring again to FIGS. 15 and 16, the powered drive unit 730 comprises one set of four omni wheels 731 (also referred to interchangeably herein as poly wheels) rotatably mounted to a chassis member 735, two wheels 731 on each lateral side thereof, and provide the ability for the apparatus 700 to move, and thus to be steered, in all directions over the freight deck D. In alternative variations of this example, the powered drive unit 730 comprises a plurality of sets of four omni wheels 731, the sets being serially or otherwise spaced longitudinally along the length of chassis member 735.

Each omni wheel 731 comprises discs or rollers 732, of much smaller diameter than the diameter of the omni wheel 731, and the discs or rollers 732 are rotatably mounted to the omni wheel 731 around its circumference, perpendicular to the rolling direction or rolling axis of the omni wheel 731. In other words, the rotational axes of the discs or rollers 732 are parallel to respective tangential directions on the circumference of the omni wheel 731. Each omni wheel 731 can thus turn about its rolling axis 799 with full force over a surface, but can also slide laterally with ease.

Such omni wheels are well known in the art.

In this example, all the wheels 731 are not in parallel relationship one to another, but rather the wheels 731 are rotatably mounted to the chassis member 735 at different angles with respect to the chassis member 735, with the respective axes 732 of adjacent wheels 731 being angularly displaced one from the other at about 90°. The drive unit 730 further comprises a plurality of motors to turn each of the wheels 731 independently from one another, and controllable to selectively provide a desired rotational velocity and rolling direction (clockwise or anticlockwise) in each wheel 731 independently of the other wheels 731.

For ease of reference, the four wheels are separately designated with the reference numerals 731A (forward, right), 731B (aft, right), 731C (aft, left), 731D (forward, left), and four directions of motion for the apparatus can also be defined as forward (FWD), aft (AFT), right (RHT) and left (LFT). Also for ease of reference, and referring to FIG. 17(g), by the respective "direction of motion" V of each wheel 731 is meant the direction along which the wheel moves over a surface (such as the freight deck D, for example) when the wheel is turned around its respective axis 700. This direction of motion V can be resolved into a forwards/aft component $V_{FA}$ and a lateral, right/left component $V_{RL}$, with respect to the apparatus 700, since all the wheels 731 are inclined (or have their turning axes inclined) with respect to the forwards/aft directions and the lateral, right/left directions.

Figure 17A:
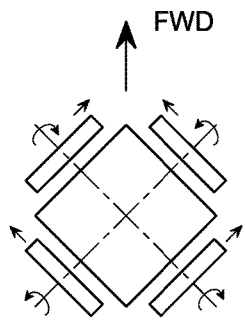
FIGS. 17(a) to 17(f) schematically illustrate various translational and rotational movements of the transport apparatus example of FIG. 15 obtained with combinations of motions of the wheels thereof.
Figure 17B:
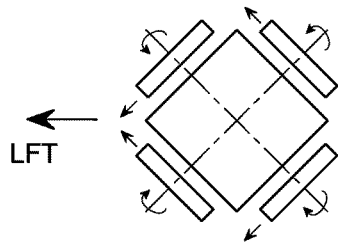

As can be seen from FIGS. 17(a) to 17(f), the drive unit 730 can be steered as follows:

To move the apparatus 700 in a forward direction (FWD), all the wheels 731 are rotated so that they all move in a direction having a direction component $V_{FA}$ in the forward direction (FWD) (FIG. 17(a)).

Figure 17C:
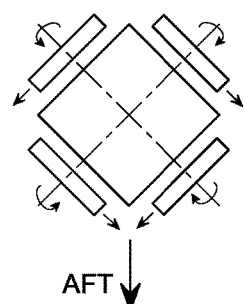

To move the apparatus 700 in a aft direction (AFT), all the wheels 731 are rotated so that they all move in a direction having a direction component $V_{FA}$ in the aft direction (AFT) (FIG. 17(c)).

To move the apparatus 700 in a left direction (LFT), all the wheels 731 are rotated so that they all move in a direction having a direction component $V_{RL}$ in the left direction (LFT) (FIG. 17(b)).

Figure 17D:
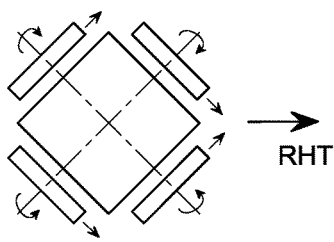
Figure 17E:
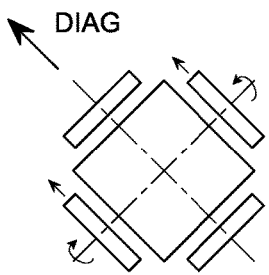
Figure 17F:
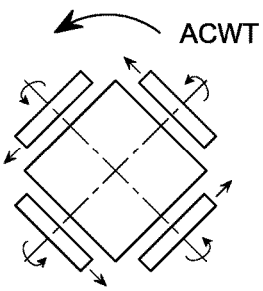
Figure 17G:
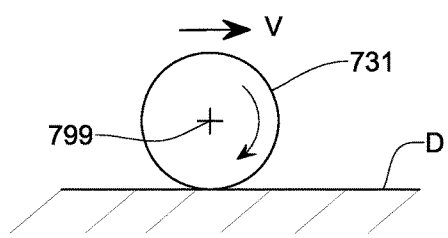
FIG. 17(g) schematically illustrates the direction of motion of a wheel of transport apparatus example of FIG. 15.

To move the apparatus 700 in a right direction (RHT), all the wheels 731 are rotated so that they all move in a direction having a direction component $V_{RL}$ in the right direction (RHT) (FIG. 17(d)).

Thus, to move the apparatus 700 in any one of the major directions forward, aft, right or left, all the wheels 731 are rotated so that they all move in a direction having a direction component $V_{RL}$ or $V_{FA}$ parallel to the desired major direction.

To move the apparatus 700 in any diagonal direction with respect to the major directions forward, aft, right or left, the two wheels 731 having their axes parallel to the desired diagonal direction are not rotated, while the other two wheels 731 having their axes orthogonal to the desired direction are rotated so that they all move in a direction V parallel to the desired diagonal direction (FIG. 17 (e)).

To rotate the apparatus 700 in an anticlockwise direction with respect to a vertical axis (viewed from above), all the wheels 731 are turned clockwise so that for each opposed pair of wheels (first pair—wheels 731A, 731C; second pair 731B, 731D) the two wheels move in opposite directions to form a couple in the anticlockwise direction (FIG. 17 (e)).

Conversely, to rotate the apparatus 700 in a clockwise direction with respect to a vertical axis (viewed from above), all the wheels 731 are turned anticlockwise so that for each opposed pair of wheels the two wheels move in opposite direction to form a couple in the clockwise direction.

Thus, the drive unit 730 is configured for providing the apparatus 700 with at least two translational degrees of freedom over the freight deck D and one rotational degree of freedom about an axis orthogonal to the freight deck D. It is evident that the drive unit 730 (and thus the apparatus 700) can be steered by combining these translational and rotational motions in any desired manner to provide any desired translational and rotational motion over a surface such as the freight deck D. Such steering is controlled by the controller 760, to operate the apparatus 700 manually, automatically and/or autonomously.

In alternative variations of this example, the omni wheels of the third example of the presently disclosed subject matter can be replaced with Mecanum wheels, which are similar to the omni wheels, but the respective peripheral rollers are mounted to the circumference of the wheel with the roller axes each being obliquely positioned (e.g. at) 45° to the rolling axis of the wheel. In such an example, one front wheel has left-handed rollers with the respective rear wheel on the same side of the chassis member 735 having right-handed rollers, while the other front wheel has right-handed rollers and the other rear wheel has left-handed rollers. Thus each wheel applies a force generally orthogonally to the diagonal that the wheel is on, and the apparatus can thus steered along any desired direction. When all four wheels are moved in the same direction with respect to a ground surface, the apparatus is moved forward or backwards; when the wheels on one side of the chassis member 735 are moved in the opposite direction to those on the other side, the apparatus is rotated about a vertical axis; when wheels on one diagonal are rolled in the opposite direction to those on the other diagonal (with respect to the ground), the apparatus is moved laterally. Thus, these combinations of these movements allow steering of the apparatus on the freight deck in any direction and/or rotation.

Such Mecanum wheels are well known in the art.

In alternative variations of this example, the drive unit 730 can instead comprise any other plurality of omni wheels or Mecanum wheels—for example three omni wheels or more than four omni wheels, to provide the aforesaid two degrees of freedom in translation and one degree of freedom in rotation. In such examples in which the drive unit comprises three omni wheels, these can be in triangular configuration, with the wheels angularly displaced from one another about the center of the chassis by 120° for example, and commonly known as a Kiwi Drive.

In other alternative variations of this example, the wheels of the drive unit 730 are rotatably mounted to the chassis member 735 in parallel relationship to one another, two wheels 731 on each side thereof, and steered using differential steering (also referred to as skid steering), in which by varying the speed or rolling direction of the wheels the apparatus 700 can be turned in any desired direction.

The cargo support system 1200 and the locking devices 1400 are respectively similar to the cargo support system 200 and locking devices 400 as described for the first example, mutatis mutandis, and will not be described in any further detail herein.

The guiding system 1300 is an active guiding system, and is configured for enabling the apparatus 700 to be guided into alignment with the pair of parallel support rails 220 of the cargo support system 200 provided in the respective cargo path CS, and so that the apparatus 700 can move between the support rails 1220 of the cargo support system 1200 to any desired position along the respective cargo path CS.

The guiding system 1300 in this example comprises a plurality of sensors 1320 strategically located on the apparatus 700, and which are operatively connected to the controller 760. For example, two such sensors 1320 are provided on the forward end of the apparatus 700. The sensors 1320 detect laser light emitted from a plurality of emitters 1330 provided along the nominal path of the apparatus from the cargo door CD. The emitters 1330 are located at positions such that the intensity of the laser light detected by the sensors is at a maximum when the apparatus 700 is aligned with the desired path, and less than maximum when the apparatus deviates from this path. The various laser emitters can operate concurrently, or in any desired sequence along the path. Accordingly, the controller 760 steers the apparatus 700 by attempting to maximize the detected laser light at the detectors.

In alternative variations of this example, the guiding system 1300 can operate in a similar manner to optical guidance system 310', mutatis mutandis.

In alternative variations of this example, the active guidance system 1300 can comprise visual markings on the freight deck, for example retro-reflective lines that mark the desired path of the apparatus 700 from the parked position between the spacer blocks 770 to each of the cargo paths CS. The guidance system can further comprise illumination devices and optical sensors on the underside of the apparatus 700 that respectively illuminate the floor and record the reflected light, which is at highest intensity when the reflected light originates from the visual markings. The controller 760 steers the apparatus 700 by attempting to maximize the detected reflected light at the detectors.

In alternative variations of this example, the guiding system 1300 can be in the form of the passive version of guiding system 300 of the first example comprising guide rails 310, as described above mutatis mutandis. In operation, the controller 760 steers the apparatus 700 into alignment with the laterally spaced guide rails 310 and such that the wheels 731 are guided on the guide rails 310 when the apparatus 700 is moved forward or backwards.

In alternative variations of this example, the cargo handling system 20 can omit the guiding system 1300, and the apparatus 700 can be guided to the desired locations over the freight deck by manual control, wherein a human controller manually guides the apparatus 700 via remote control, using cables for example.

In alternative variations of this example, the controller 760 operates as manual control for controlling the movement of the apparatus, and thus an operator manually operates the apparatus, using suitable control switches/devices in a control box, operatively connected to the apparatus 700 via wireless remote control, and thus controller 760 comprises a wireless remote control system including a suitable signal receiver (and optionally signal transmitter) system for receiving signals from the operator (and optionally transmitting signals to the operator, for example relating to operation of the apparatus 700). The operator can be in the aircraft itself, or in a completely remote location, and can monitor operation of the system 20 via cameras installed in the aircraft, for example.

In any case, the powered drive unit 730 is electrically powered to enable the apparatus 700 to be selectively and controllably steered within the respective cargo storage path CS to any desired position thereon. In this example, the electrical power is provided by a battery carried by the chassis member 735, which is configured for being recharged in one or more of an automated, automatic and manual manner, via recharging system 750. Recharging system 750 is similar to recharging system 500 as described above for the first example or second example, mutatis mutandis, and comprises a recharger docking station 752, provided wherever convenient, for example in the area S, and a docking head 754 provided on the apparatus 700. A first set of electrical terminals are provided at docking head 754, and electrically connected to the battery, and a second set of electrical terminals are provided at docking station 752, and electrically connected to a power supply of the aircraft AC, or to an external power supply, routed via the aircraft AC. The docking head 754, docking station 752, and the first and second sets of electrical connections have mating structures such that to ensure that when the apparatus 700 approaches the docking station 752, and docking head 754 docks with the docking station 752, the first set of electrical terminals establish electrical connection with the second set of electrical terminals, enabling the battery to be recharged. The apparatus 700 can be docked to the docking station 752 manually, automatically, or autonomously, for example as described above for the first example, mutatis mutandis.

Additionally or alternatively, the electrical power is provided by a battery carried by the chassis member 735, but this is connected to a power source in the aircraft or outside of the aircraft via electrical cables that are wound on a spool and carried either by the apparatus 700 or located on the freight deck, and the cable is spooled in or out according to the location of the apparatus 700 in the respective cargo path CS, and allows the battery to be recharged continuously or as required, and independent of the position of the apparatus 700. Alternatively, no battery is carried by the apparatus 700, and power is routed directly to the apparatus 700 from a power source in the aircraft or outside of the aircraft via electrical cables, for example as described above for the first example, mutatis mutandis.

One mode of operation of system 20 for loading a plurality of pallets P in the freight deck D is as follows.

First, a pallet P supporting a cargo unit is loaded from outside of the aircraft AC into the area S via the cargo door CD in a conventional manner, and is deposited on spacer blocks 770. If the apparatus 700 is not already in its initial position between the spacer blocks 770, the apparatus 700 is controllably steered to this position, manually, automatically or autonomously. For this purpose, the area S does not require any BTU's or pivotable PDU's therein, and thus the deck D at area S can be flat, for example Next, the apparatus 700 engages the pallet P via the respective releasable engagement system 710.

Then, the pallet P is manipulated on area S by steering the apparatus 700 to align the pallet P with a particular desired cargo path CS, for example cargo storage path CS1, and the pallet P is moved onto the rails 220 of the respective cargo support system 200 at a portion thereof abutting the area S. The powered drive unit 730 continues to drive the apparatus 700 together with the pallet P along the cargo path CS to its required position.

In other words, in operation the apparatus 700 effectively carries the pallet P over the freight deck to a desired location thereon, though while the pallet P is being thus transported on the rails 220, most or all of the weight of the pallet P, and of course the cargo thereon, is being supported by the respective cargo support system 200.

If this is the first pallet P that is being processed along cargo path CS1, then its position is typically chosen to be at the far, forward end of the cargo path CS1, closest to the nose of the aircraft AC, and the pallet P is locked in place via the respective locking devices 400. If there is another pallet at this position already, the current pallet P is moved to a position immediately aft thereof via the apparatus 700, and then locked in place via the respective locking devices 400.

Once the pallet P is locked in place, the apparatus 700 is disengaged from the pallet P by disengaging the releasable engagement system 710, and the apparatus 700 is then moved back towards area S, in particular to its initial position between the spacer blocks 770 to engage with and transport the next pallet P to the next position along the storage path CS1, after which the pallet is locked in position.

This procedure can be repeated until the storage path CS1 has been filled with the desired number of pallets P up to its full capacity. The other storage paths CS2, CS3, CS4, can be provided with pallets P in a similar manner to that described for storage path CS1, mutatis mutandis, each concurrently therewith (using a plurality of apparatuses 700), or in any desired sequence (using one or more apparatuses 700 in turn). Thus, the same apparatus 700 can be used for each storage path CS in turn, or several apparatuses 700 can be employed, one for each or several storage paths CS, allowing for concurrent operation.

Unloading the pallets from the freight deck D comprises the same steps as loading, but in reverse.

It is to be noted that one or more of cargo storage paths CS can deviate from being parallel to the aircraft centerline CL where the cross-section of the aircraft begins to significantly decrease towards the nose and tail of the aircraft, for example as illustrated in FIG. 2(*a*), and the apparatus 700 can be steered along each respective cargo path CS via the controller 760 and guiding system 1300. In yet other alternative variations of this example, the aircraft AC is configured for receiving the pallets P via the nose or tail of the aircraft, and thus in the respective cargo handling system each pallet P is transported by the apparatus 700 along the respective cargo storage path CS, and after the pallet has been locked in place the apparatus 700 returns to the nose or tail opening to then transport another pallet along the respective cargo storage paths CS, and so on for the other pallets. The spacer blocks are in such a case placed near the nose or tail opening.

Figure 18A:
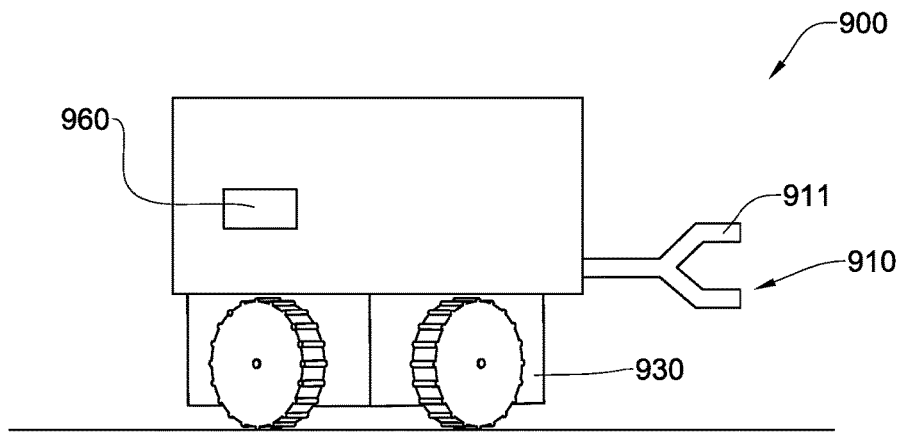
FIG. 18(a) is a side view of an alternative example of a transport apparatus comprised in the cargo handling system example of FIG. 14.
Figure 18B:
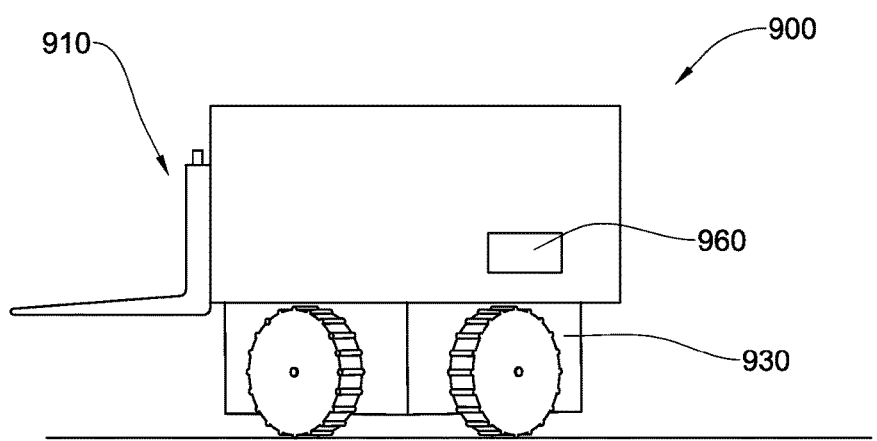
FIG. 18(b) is a side view of another alternative example of a transport apparatus comprised in the cargo handling system example of FIG. 14.

Referring to FIGS. 18(*a*) and 18(*b*), a fourth example of the apparatus, designated 900, has all the elements and functions of the apparatus 700, mutatis mutandis, with some differences as will become clearer herein. In this example the apparatus 900 has a maximum height that is not restricted to spacing T, and the apparatus 900 cannot fit under a pallet P i.e., the apparatus 900 is not configured for being accommodated in the space M between the lower face LF of the pallet P and the freight deck D, although parts of the apparatus 900 can indeed enter the space M during operation thereof.

Rather, apparatus 900 is configured for being selectively affixed to a pallet P and for assuming a position forward or aft of the pallet P in a similar manner to apparatus 800 according to the second example of the presently discoed subject matter. This enables the apparatus 900 to be steered while pushing or pulling the pallet P over area S and along the desired cargo storage path CS, to its position thereon, after which the pallet P can be deposited and affixed in place, and the apparatus 900 can then disengage from the pallet P and move away therefrom. In other words, in operation the apparatus 900 tows the pallet P over the freight deck to a desired location thereon. In this example, the apparatus 900 is configured for selectively transporting each pallet P, one at a time, while each respective pallet P is in juxtaposed forward-aft relationship therewith.

Apparatus 900 thus comprises, a powered drive unit 930 and a controller 960, similar to the powered drive unit 730 and a controller 760 of the third example, mutatis mutandis.

Apparatus 900 also comprises a releasable engagement system 910 similar to the releasable engagement system 810 of the second example, mutatis mutandis, and is thus configured for selectively engaging and for selectively disengaging the apparatus 800 with respect to each pallet P, in operation of the respective cargo handling system. Thus, and referring to FIG. 18(*a*) in particular, the releasable engagement system 910 comprises a clamping system 911 configured for selectively clamping the lip Q of the pallet P, for example similar to the clamping system, 811 of the second example, mutatis mutandis. Alternatively, and referring to FIG. 18(*b*) in particular, the engagement system 910 can be in the form of a fork-lift arrangement, for example similar to the fork lift arrangement of the second example, mutatis mutandis.

In the fourth example the transport apparatus 900 essentially replaces the transport apparatus 700 in a fourth example of the cargo handling system 20'. Thus, and referring to FIG. 19, cargo handling system 20' according to the fourth example thereof comprises one or more transport apparatus 900, the cargo support system 1200, the guiding system 1300, and the plurality of locking devices 1400 located on the freight deck D, as disclosed herein for the third example, mutatis mutandis. Each cargo unit comprises or is carried on a respective pallet P, with respect to a cargo storage path CS defined on the freight deck D of an aircraft AC.

System 20' can be operated in a similar manner to the third example of system 20, mutatis mutandis, with the main difference being that the apparatus 900 engages with each pallet via the respective releasable engagement system 910 and moves each pallet thus engaged in juxtaposed relationship rather than the overlying relationship of the third example. Unloading the pallets from the freight deck D comprises the same steps as loading, but in reverse.

In alternative variations of this example, the controller 960 operates as manual control for controlling the movement of the apparatus 900, and thus an operator manually operates the apparatus, using suitable control switches/devices in a control box, operatively connected to the apparatus 900 via wireless remote control, and thus controller 960 comprises a wireless remote control system including a suitable signal receiver (and optionally signal transmitter) system for receiving signals from the operator (and optionally transmitting signals to the operator, for example relating to operation of the apparatus 900). The operator can be in the aircraft itself, or in a completely remote location, and can monitor operation of the system 20' via cameras installed in the aircraft, for example.

It is to be noted that the feature of wireless remote control system for the cargo handling system according to the first aspect of the presently disclosed subject matter (for example as disclosed above for the first, second, third or fourth examples or alternative variations thereof) is novel per se, and is applicable also to conventional cargo handling systems, mutatis mutandis.

Thus, according to a second aspect of the presently disclosed subject matter, there is also provided a cargo handling system for a freight deck of an aircraft, comprising:
support structure configured for at least partially supporting at least one cargo unit thereon over the freight deck;
transport apparatus configured for selectively transporting the at least one cargo unit over said support structure;
wireless control system for wirelessly controlling operation of said transport apparatus.

In at least one example according to the second aspect of the presently disclosed subject matter, the support structure, the transport apparatus and the wireless control system can comprise the support structure, the mobile transport apparatus and the wireless remote control system, respectively, as disclosed above for the first, second, third or fourth examples or alternative variations thereof, according to the first aspect of the presently disclosed subject matter, mutatis mutandis.

In at least one other example according to the second aspect of the presently disclosed subject matter, the support structure and the transport apparatus can comprise the support structure and the transport apparatus used in conventional cargo transport systems. For example, the transport apparatus comprises a plurality of powered drive units (PDU's) statically located on the freight deck and longitudinally spaced parallel to the support structure, which is conventionally in the form of rails comprising rollers on an upper part thereof. Each PDU includes a powered drive wheel configured for selectively engaging an underside of the respective cargo unit for moving the respective cargo unit over the support structure. The wireless control system can comprise the wireless remote control system as disclosed above for the first, second, third or fourth examples or alternative variations thereof, according to the first aspect of the presently disclosed subject matter, mutatis mutandis.

In any case, the wireless control system according to the second aspect of the presently disclosed subject matter comprises a transmitter unit remote from a receiver unit, the receiver unit being operatively coupled to the respective transport apparatus and configured for controlling operation of the transport apparatus responsive to receiving control signals transmitted from the transmitter unit, which is remotely operated by the user. For example, the control signals include electromagnetic signals, for example radio signals, infra red signals, microwave signals, and so on.

It is to be noted that the feature of the active guiding system for the cargo handling system according to the first aspect of the presently disclosed subject matter (for example as disclosed above for the first, second, third or fourth examples or alternative variations thereof) is one example of a sensor system that is novel per se, and is applicable also to conventional cargo handling systems, mutatis mutandis.

Thus, according to a third aspect of the presently disclosed subject matter, there is also provided a cargo handling system for a freight deck of an aircraft, comprising:
support structure configured for at least partially supporting at least one cargo unit thereon over the freight deck;
sensor system configured for outputting an alignment signal representative of an alignment of the cargo unit with respect to the support structure.

In at least one example according to the third aspect of the presently disclosed subject matter, the support structure and the sensor system can comprise the support structure and the active guiding system, respectively, as disclosed above for the first, second, third or fourth examples or alternative variations thereof, according to the first aspect of the presently disclosed subject matter, mutatis mutandis.

In at least one other example according to the third aspect of the presently disclosed subject matter, the support structure can comprise the support structure of conventional cargo transport systems, and the sensor system is configured for guiding the manual manipulation of the cargo units into alignment with the support structure. Thereafter, once the cargo unit is aligned on the support structure, the cargo unit can be moved along using a conventional PDU or the mobile transport apparatus according to the first aspect of the presently disclosed subject matter.

In at least some examples, the aforesaid alignment refers to (and thus comprises) the degree of actual alignment between cargo unit and the support structure compared with an ideal alignment, and can include an angular and/or a translational deviation from the ideal alignment. The alignment signal generated by the sensor system is representative of this degree of alignment. For example, this ideal alignment occurs where the cargo unit is sufficiently aligned with respect to the support structure to enable the cargo unit to be moved over the support structure while supported by the support structure.

In at least one such example, the sensor system comprises a first component coupled to the cargo unit and a second component coupled to the support structure, and the first component interacts with the second component to generate the alignment signal. For example one of said first component and second component comprises a transmitter and the other one of said first component and second component comprises a receiver. The receiver transmits energy to the receiver (for example infra red, radio waves, ultrasound, microwaves, and so on), and a parameter of this energy (for example the intensity thereof) varies as a function of the degree of alignment, enabling the sensor system to generate the alignment signal, which can have a signal strength, for example, that is related to this degree of alignment.

In another example, the first component comprises an image acquisition system and second component comprises a visual marker representative of the aforesaid ideal alignment. For example the first component can be a digital camera with optical recognition software for example, and the second component can be a strip running along the direction towards the support structure, the strip being reflective or of a different colour to the rest of the floor, and is thus easily recognizable visually. The image acquisition system obtains and processes images of the visual marker, enabling the sensor system to generate the alignment signal, which can have a signal strength, for example, that is related to this degree of alignment.

In any case, such an alignment signal can be provided in the form of an audio signal and/or a visual signal to guide manual manipulation of the cargo unit into alignment with the support structure. For example, one or more persons pushing the cargo unit into alignment with the support structure can maneuver the cargo unit on the BTU's by listening to the audio signal and/or observing the visual signals. For example, the audio signals can be provided via one or more speakers, and can be in the form of beeps for example, in which the loudness thereof and/or the frequency thereof increase the closer the cargo unit is in ideal alignment with the support structure (culminating in a constant tone when alignment is reached, for example), and vice versa. For example, the visual signals can comprise a series of LED's or other light sources in prominent display, for example on the cargo unit itself or in the freight deck, and the number of LED's that are lit increases the closer the cargo unit is in ideal alignment with the support structure (culminating in all the LED's being lit when alignment is reached, for example), and vice versa.

In examples where the cargo unit is supported and transported over the flight deck on a mobile transport apparatus (for example, as disclosed above for the first, second, third or fourth examples or alternative variations thereof, according to the first aspect of the presently disclosed subject matter, mutatis mutandis), the alignment signal can be a digital signal or any other control signal for controlling the operation, and in particular the motion, of the mobile transport unit.

In the method claims that follow, alphanumeric characters and Roman numerals used to designate claim steps are provided for convenience only and do not imply any particular order of performing the steps.

Finally, it should be noted that the word "comprising" as used throughout the appended claims is to be interpreted to mean "including but not limited to".

While there has been shown and disclosed examples in accordance with the presently disclosed subject matter, it will be appreciated that many changes may be made therein without departing from the spirit of the presently disclosed subject matter.

The invention claimed is:

1. A cargo handling system for a freight deck of an aircraft, the cargo handling system comprising:
   a support structure configured for at least partially supporting at least one cargo unit thereon;
   at least one mobile transport apparatus configured for selectively moving over the freight deck to a plurality of locations thereon, for selectively engaging to the at least one cargo unit, for selectively propelling said at least one cargo unit over said freight deck while the apparatus is engaged to the at least one cargo unit, for enabling said at least one cargo unit to be deposited at a desired said location supported on said support structure, and for selectively disengaging from the at least one cargo unit;
   a plurality of locking devices configured for selectively releasably locking the at least one cargo unit with respect to the freight deck at said desired location;
   wherein said at least one mobile transport apparatus is configured for propelling the said at least one cargo unit when said at least one cargo unit is in overlying engaging relationship with said at least one mobile transport apparatus; and
   wherein parts of said at least one mobile transport apparatus in said overlying engaging relationship with said at least one cargo unit have a height dimension from the freight deck not exceeding a datum height dimension defined by said support structure, at least while said at least one mobile transport apparatus is propelling the said at least one cargo unit with respect to said support structure.

2. The cargo handling system according to claim 1, wherein said at least one mobile transport apparatus comprises a releasable engagement system for selectively engaging with and disengaging from said at least one cargo unit, and a powered drive unit configured for selectively propelling the respective said mobile transport apparatus over the freight deck.

3. The cargo handling system according to claim 2, wherein said powered drive unit comprises a plurality of wheels rotatably mounted thereto and configured for rolling over the freight deck.

4. The cargo handling system according to claim 2, wherein said releasable engagement system is configured for releasably engaging with an underside of said at least one cargo unit.

5. The cargo handling system according to claim 4, wherein said releasable engagement system comprises an apparatus height changing system, configured for selectively changing the height of said mobile transport apparatus from a first height, less than said datum height dimension, to a second height, corresponding to said datum height dimension.

6. The cargo handling system according to claim 1, wherein said support structure comprises at least one pair of parallel spaced support rails configured for at least partially supporting said at least one cargo unit thereon while said at least one mobile transport apparatus is propelling the said at least one cargo unit with respect to said support structure.

7. The cargo handling system according to claim 6, wherein said support rails comprise rollers rotatably mounted to an upper part thereof, such as to allow said at least one cargo unit to move over said spaced support rails with said rollers in rolling contact with said at least one cargo unit while said at least one mobile transport apparatus is propelling the said at least one cargo unit with respect to said support structure.

8. The cargo handling system according to claim 1, wherein said at least one mobile transport apparatus is configured having a height between 2 inches and 5 inches.

9. The cargo handling system according to claim 1, wherein said at least one mobile transport apparatus is configured for propelling the said at least one cargo unit when said at least one cargo unit is in at least partially juxtaposed relationship therewith.

10. The cargo handling system according to claim 1, further comprising a controller configured for remotely controlling operation of said at least one mobile transport apparatus.

11. The cargo handling system according to claim 1, further comprising a guiding system configured for guiding said at least one mobile transport apparatus with respect to the freight deck.

12. The cargo handling system according to claim 11, wherein said guiding system comprises guiding rails configured for constraining movement of said wheels to said guiding rails.

13. The cargo handling system according to claim 11, wherein said guiding system comprises a sensor arrangement configured for providing control signals to said at least one mobile transport apparatus for controlling movement thereof along a predetermined path over the freight deck.

14. The cargo handling system according to claim 1, wherein said at least one mobile transport apparatus comprises at least one of:
 a battery, the cargo handling system further comprising a recharging system, including a recharger docking station provided in the freight deck and connected to a power supply and a docking head provided in the at least one mobile transport apparatus, the docking head and docking station being configured for establishing electrical connection with one another when said docking head docks with said docking station; or
 electrical cables reversibly wound on a spool, the spool being mounted to one of the at least one mobile transport apparatus or the freight deck, and wherein electrical power is provided to the mobile transport apparatus by a power source in the aircraft or outside of the aircraft via said electrical cables, and wherein the electrical cables are spooled in or out according to the relative location of the at least one mobile transport apparatus with respect to the freight deck.

15. The cargo handling system according to claim 1, wherein said cargo unit is in the form of, or comprises, a pallet.

16. A mobile transport apparatus for use with a cargo handling system for a freight deck of an aircraft, the mobile transport apparatus configured for selectively moving over the freight deck to a plurality of locations thereon, for selectively engaging to at least one cargo unit, for propelling said at least one cargo unit over said freight deck when the apparatus is engaged to the at least one cargo unit, for depositing said at least one cargo unit on a desired said location supported on a support structure provided on the freight deck, and for selectively disengaging from the at least one cargo unit;
 wherein said mobile transport apparatus is configured for propelling said at least one cargo unit when said at least one cargo unit is in overlying engaging relationship with said mobile transport apparatus or in at least partially juxtaposed relationship with said at least one cargo unit; and
 wherein parts of said mobile transport apparatus in said overlying engaging relationship with said at least one cargo unit have a height dimension from the freight deck not exceeding a datum height dimension defined by the support structure, at least while said at least one mobile transport apparatus is propelling the said at least one cargo unit with respect to said support structure.

17. The mobile apparatus according to claim 16, further comprising a releasable engagement system for selectively engaging with and disengaging from said at least one cargo unit, and a powered drive unit configured for selectively propelling the respective said mobile transport apparatus over the freight deck.

18. The mobile transport apparatus according to claim 17, wherein said releasable engagement system comprises at least one retractable powered engagement unit, comprising at least one roller or wheel mounted to a housing member and selectively deployable between at least a first upper position for maximum frictional engagement between the roller or wheel and the underside of the cargo unit and a second position in which the roller or wheel is fully disengaged with respect to the underside of the cargo unit.

19. The mobile transport apparatus according to claim 16, further comprising mechanical abutment members at each one of the front end and the rear end thereof, the mechanical abutment members being selectively deployable form a retracted position to a deployed position, wherein in the deployed position the abutment members prevent relative forward and aft movement between the cargo unit and the apparatus, and wherein in the retracted position the abutment members cannot prevent relative forward and aft movement between the cargo unit and the apparatus.

20. The mobile apparatus according to claim 16, wherein said mobile transport apparatus is configured having a height between 2 inches and 5 inches.

21. The mobile apparatus according to claim 16, wherein said mobile transport apparatus further comprises a controller configured for enabling remotely controlling operation thereof.

22. The mobile apparatus according to claim 16, further comprising a guiding system configured for guiding said mobile transport apparatus with respect to the freight deck.

23. The mobile apparatus according to claim 16, wherein said mobile transport apparatus comprises at least one of:
 a battery, and further comprising a recharging system, including a recharger docking station provided in the freight deck and connected to a power supply and a docking head provided in the mobile transport apparatus, the docking head and docking station being configured for establishing electrical connection with one another when said docking head docks with said docking station; or
 electrical cables reversibly wound on a spool, the spool being mounted to one of the mobile transport apparatus and the freight deck, and wherein electrical power is provided to the mobile transport apparatus by a power source in the aircraft or outside of the aircraft via said electrical cables, and wherein the electrical cables are spooled in or out according to the relative location of the mobile transport apparatus with respect to the freight deck.

24. A method for handling cargo units on a freight deck of an aircraft, the method comprising:
 causing at least one mobile transport apparatus to move over the freight deck to at least one of a plurality of locations thereon;
 selectively engaging the at least one mobile transport apparatus to the at least one cargo unit at one said location;

propelling said at least one cargo unit over said freight deck to a second said location while the at least one mobile transport apparatus is engaged to the at least one cargo unit;

selectively disengaging the mobile transport apparatus from the at least one cargo unit; and depositing said at least one cargo unit at said second location on the freight deck, supported on a support structure provided on the freight deck, wherein said mobile transport apparatus is configured for propelling the said at least one cargo unit when said at least one cargo unit is in overlying engaging relationship therewith or in at least partially juxtaposed engaging relationship therewith; and wherein parts of said mobile transport apparatus in said overlying engaging relationship with said at least one cargo unit have a height dimension from the freight deck not exceeding a datum height dimension defined by the support structure, at least while said at least one mobile transport apparatus is propelling the said at least one cargo unit with respect to said support structure.

25. The method according to claim 24, further comprising:

providing a support structure on the flight deck and comprising the step of depositing said at least one cargo unit at said second location on said support structure on the freight deck; and selectively releasably locking the at least one cargo unit with respect to the freight deck at said second location.

26. The method according to claim 24, further comprising controlling the motion of the mobile transport apparatus over the freight deck in any one of a manual manner, an automatic manner, an autonomous manner and via remote control.

27. The method according to claim 24, further comprising at least one of:

inserting a said cargo unit into the freight deck via a side entrance of the aircraft, steering said mobile transport apparatus towards said cargo unit, engaging said cargo unit and steering the mobile transport apparatus to a desired location along a desired cargo path defined on the freight deck, depositing said cargo unit thereat, and disengaging said mobile transport apparatus from said cargo unit;

inserting a said cargo unit into the freight deck via a side entrance of the aircraft, aligning and directing said cargo unit, towards a desired rectilinear cargo path defined on the freight deck, engaging said cargo unit and to said mobile transport apparatus on said cargo path, propelling said mobile transport apparatus to a desired location along a desired cargo path while engaged to the cargo unit, depositing said cargo unit thereat, and disengaging said mobile transport apparatus from said cargo unit; or inserting a said cargo unit into the freight deck via a nose or tail entrance of the aircraft, steering said mobile transport apparatus towards said cargo unit, engaging said cargo unit and steering the mobile transport apparatus to a desired location along a desired cargo path defined on the freight deck, depositing said cargo unit thereat, and disengaging said mobile transport apparatus from said cargo unit.

28. The method according to claim 24, further comprising selectively changing the height of said mobile transport apparatus from a first height, less than a spacing of a space between the cargo unit and the freight deck, introducing the mobile transport apparatus into said space so that said cargo unit is overlying said mobile transport apparatus, to a second height, greater than said first height and corresponding to said spacing, wherein to engage with an underside of the cargo unit.

* * * * *